United States Patent
Yamazaki

(10) Patent No.: US 11,701,833 B2
(45) Date of Patent: *Jul. 18, 2023

(54) THREE-DIMENSIONAL SHAPING APPARATUS AND THREE-DIMENSIONAL SHAPED ARTICLE PRODUCTION METHOD

(71) Applicant: SEIKO EPSON CORPORATION, Tokyo (JP)

(72) Inventor: Shigeru Yamazaki, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/239,724

(22) Filed: Apr. 26, 2021

(65) Prior Publication Data
US 2021/0331418 A1    Oct. 28, 2021

(30) Foreign Application Priority Data
Apr. 27, 2020 (JP) .................. 2020-078137

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
None
See application file for complete search history.

(56) References Cited

U.S. PATENT DOCUMENTS 6,332,355 B1    12/2001   Totani et al.
6,846,438 B2    1/2005    Suzuki et al.
(Continued)

FOREIGN PATENT DOCUMENTS

CN    110461578 A    11/2019
JP    2018-001586 A    1/2018
JP    2020-032623 A    3/2020

*Primary Examiner* — Armand Melendez
(74) *Attorney, Agent, or Firm* — Global IP Counselors, LLP

(57) ABSTRACT

A three-dimensional shaping apparatus includes a plasticizing section that includes a drive motor, a heater, and a screw rotated by the drive motor and that plasticizes a material to form a shaping material, an ejection section that ejects the shaping material toward a stage, a moving mechanism section that changes a relative position of the ejection section to the stage, a prediction section that predicts a residual service life of the heater from an observation result of a state observation section that observes a state of the heater, and a control unit that controls the plasticizing section and the moving mechanism section to shape a three-dimensional shaped article. The control unit has a first mode in which a temperature of the heater is set to a first temperature and a second mode in which the temperature of the heater is set to a temperature lower than the first temperature, and shapes the three-dimensional shaped article in the first mode when a first residual service life when the temperature of the heater is set to the first temperature exceeds a first value, and shapes the three-dimensional shaped article in the second mode when the first residual service life is equal to or less than the first value.

9 Claims, 17 Drawing Sheets

(51) Int. Cl.
  *B29C 64/295* (2017.01)
  *B33Y 50/02* (2015.01)
  *B33Y 10/00* (2015.01)
  *B33Y 30/00* (2015.01)
  *B29C 64/209* (2017.01)
  *G05B 19/4065* (2006.01)

(52) U.S. Cl.
  CPC ............ *B29C 64/295* (2017.08); *B33Y 10/00* (2014.12); *B33Y 30/00* (2014.12); *B33Y 50/02* (2014.12); *G05B 19/4065* (2013.01); *G05B 2219/37252* (2013.01)

(56) References Cited

U.S. PATENT DOCUMENTS

| | | | |
|---|---|---|---|
| 11,504,916 B2 * | 11/2022 | Yamazaki | ............ B29C 64/295 |
| 2016/0114535 A1 | 4/2016 | Kirchman et al. | |
| 2020/0376552 A1 | 12/2020 | Fukuda et al. | |

\* cited by examiner

THREE-DIMENSIONAL SHAPING APPARATUS AND THREE-DIMENSIONAL SHAPED ARTICLE PRODUCTION METHOD

The present application is based on, and claims priority from JP Application Serial Number 2020-078137, filed on Apr. 27, 2020, the disclosure of which is hereby incorporated by reference herein in its entirety.

BACKGROUND

1. Technical Field

The present disclosure relates to a three-dimensional shaping apparatus and a three-dimensional shaped article production method.

2. Related Art

With respect to a three-dimensional shaping apparatus, an apparatus for shaping a shaped article by curing a resin through irradiation with a UV light is disclosed in US Patent Application Publication No. 2016/0114535 (Patent Document 1). In the apparatus, when the output of the UV light is decreased due to deterioration over time, and a target output value is not reached even if the electric power supply to the UV light is increased, a user is urged to replace a part constituting the UV light.

As in the above document, when a part of a three-dimensional shaping apparatus is deteriorated over time, the part deteriorated over time is, for example, replaced by a user. However, depending on the degree of deterioration over time, apart arrives at the end of its service life in the middle of shaping of a shaped article, and the part is required to be replaced in the middle of shaping in some cases. When a part is replaced in the middle of shaping, there is a possibility that deterioration of shaping quality due to suspension or resumption of shaping may occur.

SUMMARY

According to a first aspect of the present disclosure, a three-dimensional shaping apparatus is provided. The three-dimensional shaping apparatus includes a plasticizing section that includes a drive motor, a heater, and a screw rotated by the drive motor and that plasticizes a material to form a shaping material, an ejection section that ejects the shaping material toward a stage, a moving mechanism section that changes a relative position of the ejection section to the stage, a state observation section that observes a state of the heater, a prediction section that predicts a residual service life of the heater from an observation result of the state observation section, and a control unit that controls the plasticizing section and the moving mechanism section to shape a three-dimensional shaped article. The control unit has a first mode in which a temperature of the heater is set to a first temperature and a second mode in which the temperature of the heater is set to a temperature lower than the first temperature, and shapes the three-dimensional shaped article in the first mode when a first residual service life that is the residual service life when the temperature of the heater is set to the first temperature exceeds a first value, and shapes the three-dimensional shaped article in the second mode when the first residual service life is equal to or less than the first value.

According to a second aspect of the present disclosure, a three-dimensional shaped article production method for shaping a three-dimensional shaped article by plasticizing a material to form a shaping material using a plasticizing section including a drive motor, a heater, and a screw rotated by the drive motor and ejecting the shaping material from an ejection section toward a stage is provided. The production method includes a first step of observing a state of the heater, a second step of predicting a residual service life of the heater when the heater is controlled at a first temperature from an observation result of the heater, and a third step of shaping the three-dimensional shaped article by controlling the plasticizing section and a moving mechanism section that changes a relative position of the ejection section to the stage. In the third step, when the residual service life exceeds a first value, the three-dimensional shaped article is shaped by controlling a temperature of the heater to the first temperature, and when the residual service life is equal to or less than the first value, the three-dimensional shaped article is shaped by controlling the temperature of the heater to a temperature lower than the first temperature.

DESCRIPTION OF EXEMPLARY EMBODIMENTS

A. First Embodiment

Figure 1:
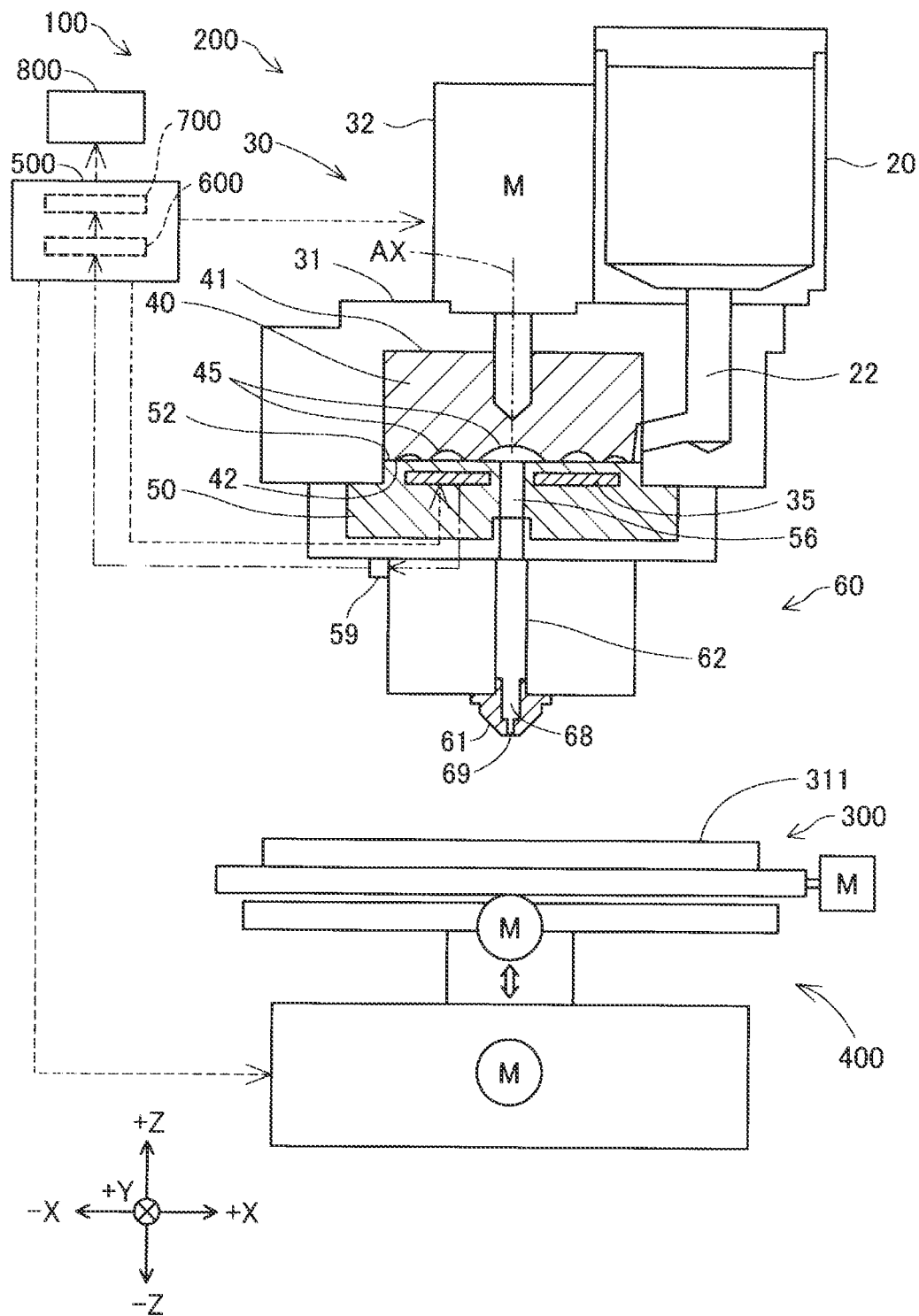
FIG. 1 is a view showing a schematic configuration of a three-dimensional shaping apparatus according to a first embodiment.

FIG. 1 is a view showing a schematic configuration of a three-dimensional shaping apparatus 100 according to this embodiment. In FIG. 1, arrows along X, Y, and Z directions orthogonal to one another are illustrated. The X, Y, and Z directions are directions along an X axis, a Y axis, and a Z axis that are three spatial axes orthogonal to one another, and each include both a direction at one side along the X axis, Y axis, and Z axis and an opposite direction thereto. The X axis and Y axis are axes along a horizontal plane, and the Z axis is an axis along a vertical line. In other drawings, arrows along the X, Y, and Z directions are also illustrated as appropriate. The X, Y, and Z directions in FIG. 1 and the X, Y, and Z directions in the other drawings indicate the same directions, respectively. In the following description, when the direction is specified, the positive direction is denoted by "+", and the negative direction is denoted by "−", and the plus and minus symbols are used together with the indication of the direction.

The three-dimensional shaping apparatus 100 in this embodiment includes a shaping unit 200, a stage 300, a moving mechanism section 400, a control unit 500, and a notification section 800. The three-dimensional shaping apparatus 100 shapes a three-dimensional shaped article having a desired shape on a shaping face 311 of the stage 300 by changing the relative position of an ejection section 60 of the shaping unit 200 to the stage 300 by driving the moving mechanism section 400 while ejecting a shaping material from the ejection section 60 toward the stage 300 under the control of the control unit 500. Note that the shaping material is sometimes referred to as "molten material".

The moving mechanism section 400 changes the relative position of the ejection section 60 to the stage 300. In this embodiment, the moving mechanism section 400 changes the relative position of the ejection section 60 to the stage 300 by moving the stage 300 with respect to the shaping unit 200. Note that the relative positional change of the ejection section 60 to the stage 300 is sometimes simply referred to as "movement of the ejection section 60". In this embodiment, for example, "to move the stage 300 in the +X direction" can also be expressed in other words as "to move the ejection section 60 in the −X direction". In addition, the relative moving speed of the ejection section 60 to the stage 300 is sometimes simply referred to as "moving speed".

The moving mechanism section 400 in this embodiment is constituted by a three-axis positioner for moving the stage 300 in three axis directions of the X, Y, and Z directions by the driving forces of three motors. Each motor drives under the control of the control unit 500. The moving mechanism section 400 need not be configured to move the stage 300, but may be configured to move the ejection section 60 without moving the stage 300. In addition, the moving mechanism section 400 may be configured to move both the stage 300 and the ejection section 60.

The shaping unit 200 includes a material supply section 20 that is a supply source of a material, a plasticizing section 30 that melts a material supplied from the material supply section 20 to forma shaping material, and the ejection section 60 that ejects the shaping material.

In the material supply section 20, a material in a state of a pellet, a powder, or the like is stored. In this embodiment, a resin formed into a pellet shape is used as the material. The material supply section 20 in this embodiment is constituted by a hopper. A supply channel 22 that couples the material supply section 20 to the plasticizing section 30 is provided below the material supply section 20. The material supply section 20 supplies the material to the plasticizing section 30 through the supply channel 22. The details of the material will be described later.

The plasticizing section 30 includes a drive motor 32, a heater 35, and a screw 40. The plasticizing section 30 of this embodiment further includes a screw case 31 and a barrel 50. The plasticizing section 30 plasticizes at least a portion of a material supplied from the material supply section 20 to form a shaping material in a paste form having fluidity and supplies the shaping material to the ejection section 60. The "plasticizing" means melting by applying heat to a material having thermoplasticity. The "melting" not only means transforming a material having thermoplasticity into a liquid by heating the material to a temperature equal to or higher than the melting point, but also means softening a material having thermoplasticity by heating the material to a temperature equal to or higher than the glass transition point so as to exhibit fluidity. The screw 40 of this embodiment is a so-called flat screw and is sometimes referred to as "scroll".

The screw case 31 is a housing for housing the screw 40. To a lower face of the screw case 31, the barrel 50 is fixed, and the screw 40 is housed in a space surrounded by the screw case 31 and the barrel 50. To an upper face of the screw case 31, the drive motor 32 is fixed.

The screw 40 has a substantially columnar shape whose height in a direction along its central axis RX is smaller than the diameter. The screw 40 has a grooved face 42 having a groove formed therein at a face opposed to the barrel 50. Specifically, the grooved face 42 is opposed to a screw opposed face 52 of the barrel 50 to be described later. The central axis RX of this embodiment coincides with the rotational axis of the screw 40. Further, the details of the configuration of the screw 40 at the grooved face 42 side will be described later.

The drive motor 32 is coupled to a face at an opposite side to the grooved face 42 of the screw 40. The screw 40 is rotated around the central axis RX by a torque generated by rotation of the drive motor 32. The drive motor 32 is driven under the control of the control unit 500. The drive motor 32 need not be directly coupled to the screw 40. For example, the screw 40 and the drive motor 32 may be coupled through a decelerator. In that case, for example, the drive motor 32 may be coupled to a planetary gear of a decelerator having a planetary gear mechanism, and the screw 40 may be coupled to a sun gear.

The barrel 50 is disposed below the screw 40 so as to be opposed to the grooved face 42 of the screw 40. The barrel 50 has the screw opposed face 52 opposed to the grooved face 42 of the screw 40. The barrel 50 is provided with a communication hole 56 on the central axis RX of the screw 40. The shaping material formed by the plasticizing section 30 is supplied to the ejection section 60 through the communication hole 56. The details of the configuration of the barrel 50 at the screw opposed face 52 side will be described later.

The heater 35 of this embodiment is embedded in the barrel 50. In this embodiment, the barrel 50 is provided with two bar-shaped heaters 35 disposed along the Y direction. The heaters 35 heat a material supplied between the screw 40 and the barrel 50 under the control of the control unit 500.

The ejection section 60 is disposed below the barrel 50. The ejection section 60 includes a nozzle 61 that ejects the shaping material toward the stage 300 and a supply flow channel 62 that causes the communication hole 56 and the nozzle 61 to communicate with each other.

In the nozzle 61, a nozzle flow channel 68 and a nozzle hole 69 are provided. The nozzle flow channel 68 is a flow channel provided in the nozzle 61. The nozzle flow channel 68 communicates with the communication hole 56 of the barrel 50 through the supply flow channel 62. The nozzle hole 69 is a portion in which the cross section of the flow channel provided in an end portion of the nozzle flow channel 68 at a side communicating with the atmosphere is reduced. The shaping material supplied to the nozzle flow channel 68 from the plasticizing section 30 through the supply flow channel 62 is ejected from the nozzle hole 69. In this embodiment, the opening shape of the nozzle hole 69 is a circular shape. The opening shape of the nozzle hole 69 is not limited to a circular shape and may be, for example, a rectangular shape or a polygonal shape other than a rectangular shape.

Figure 2:
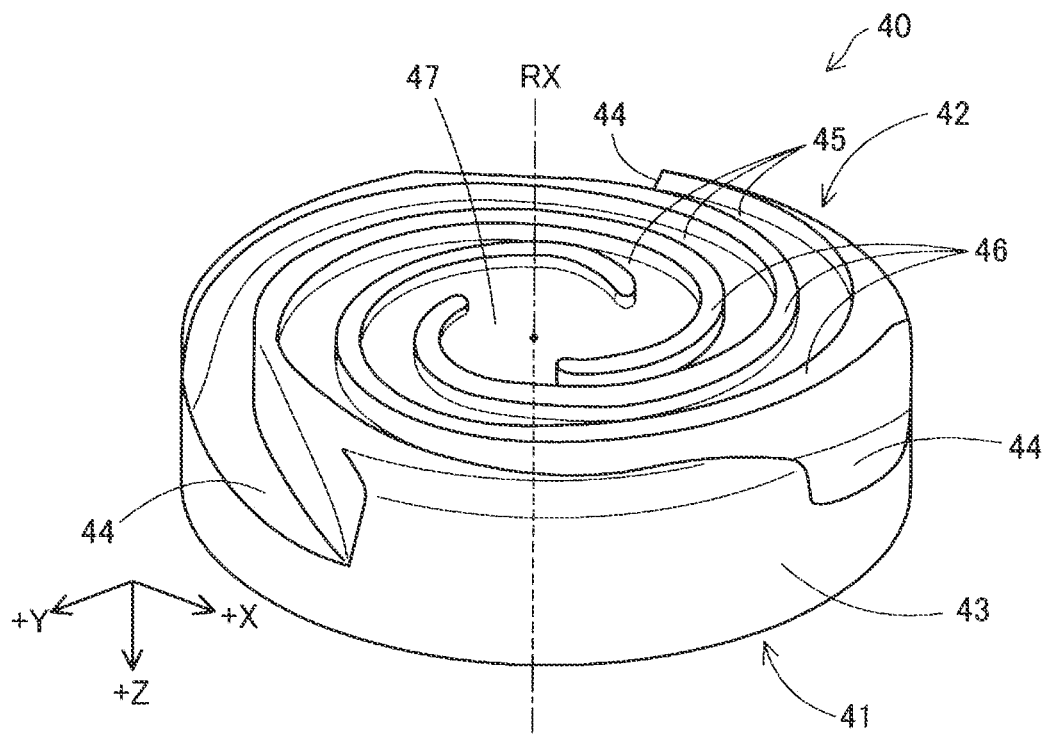
FIG. 2 is a schematic perspective view showing a configuration of a screw at a grooved face side.

FIG. 2 is a schematic perspective view showing a configuration of the screw 40 at the grooved face 42 side. In FIG. 2, the position of the central axis RX of the screw 40 is indicated by a long dashed short dashed line. As described with reference to FIG. 1, in the grooved face 42, the groove 45 is provided.

A central portion 47 of the grooved face 42 of the screw 40 is configured as a recess to which one end of the groove 45 is coupled. The central portion 47 is opposed to the communication hole 56 of the barrel 50 shown in FIG. 1. The central portion 47 crosses the central axis RX.

The groove 45 of the screw 40 constitutes a so-called scroll groove. The groove 45 extends in a spiral shape so as to draw an arc toward the outer circumference of the screw 40 from the central portion 47. The groove 45 may be configured to extend in an involute curve shape or in a helical shape. In the grooved face 42, a projecting ridge portion 46 that constitutes a side wall portion of the groove 45 and that extends along each groove 45 is provided. The groove 45 continues to a material inlet 44 formed in a side face 43 of the screw 40. This material inlet 44 is a portion for receiving the material supplied through the supply channel 22 of the material supply section 20.

In FIG. 2, an example of the screw 40 having three grooves 45 and three projecting ridge portions 46 is shown. The number of grooves 45 or projecting ridge portions 46 provided in the screw 40 is not limited to 3. In the screw 40, only one groove 45 may be provided, or a plurality of two or more grooves 45 may be provided. Further, an arbitrary number of projecting ridge portions 46 may be provided according to the number of grooves 45.

In FIG. 2, an example of the screw 40 in which the material inlet 44 is formed at three sites is shown. The number of sites where the material inlet 44 is provided in the screw 40 is not limited to 3. In the screw 40, the material inlet 44 may be provided at only one site or may be provided at a plurality of two or more sites.

Figure 3:
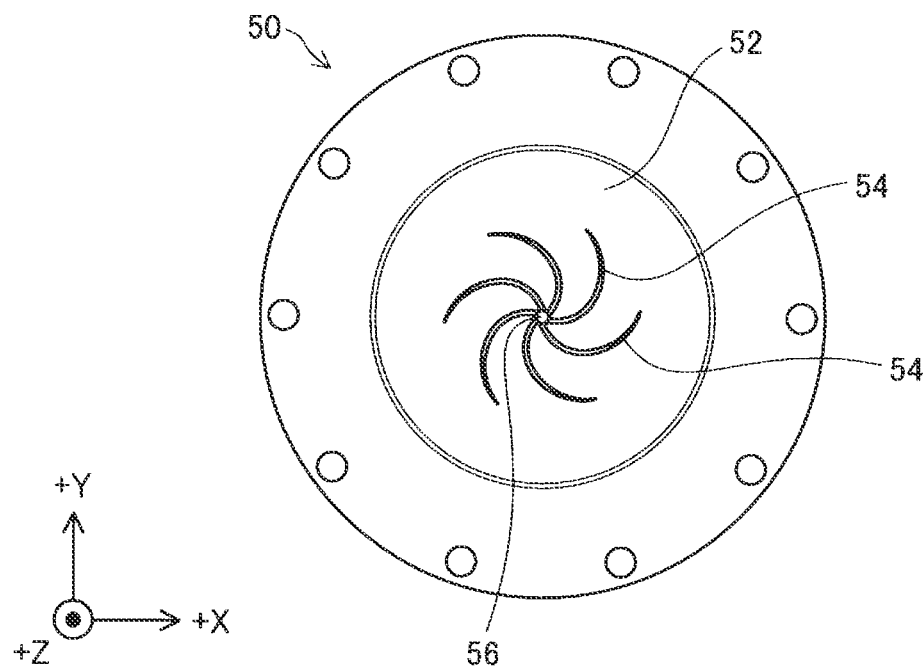
FIG. 3 is a top view showing a configuration of a barrel at a screw opposed face side.

FIG. 3 is a top view showing a configuration of the barrel 50 at the screw opposed face 52 side. As described above, at the center of the screw opposed face 52, the communication hole 56 is formed. Around the communication hole 56 in the screw opposed face 52, a plurality of guide grooves 54 are formed. One end of each of the guide grooves 54 is coupled to the communication hole 56, and each guide groove 54 extends in a spiral shape toward the outer circumference of the screw opposed face 52 from the communication hole 56. Each guide groove 54 has a function of guiding the shaping material to the communication hole 56. It is preferred to form the guide groove 54 in the barrel 50 in order to allow the shaping material to efficiently reach the communication hole 56, but the guide groove 54 need not be formed.

The control unit 500 is constituted by a computer including one or more processors, a main storage device, and an input/output interface for performing signal input/output to/from the outside. The control unit 500 exhibits various functions by execution of a program or a command read on the main storage device by the processor. For example, the control unit 500 not only exhibits a function of executing a three-dimensional shaping process, but also exhibits a function as the below-mentioned state observation section 600 or prediction section 700, or the like. The control unit 500 may be constituted not by a computer, but by a combination of a plurality of circuits.

The three-dimensional shaping process refers to a process for shaping a three-dimensional shaped article. The three-dimensional shaping process is sometimes simply referred to as "shaping process". The control unit 500 controls the plasticizing section 30 and the moving mechanism section 400 so as to eject the shaping material to the shaping face 311 from the ejection section 60 in the three-dimensional shaping process. More specifically, the control unit 500 shapes a three-dimensional shaped article by forming layers of the shaping material while solidifying the shaping material ejected onto the shaping face 311. The "solidifying the shaping material" means that the shaping material ejected from the ejection section 60 loses its fluidity. In this embodiment, the shaping material loses its plasticity and is solidified by cooling.

The control unit 500 of this embodiment shapes a three-dimensional shaped article according to shaping data in the three-dimensional shaping process. The shaping data are data including the relative movement path of the ejection section 60 to the stage 300 and the line width of the shaping material in the movement path. The control unit 500 generates shaping data by dividing a three-dimensional shaped article on shape data representing the shape of the three-dimensional shaped article generated using, for example, 3D CAD software or 3D CG software into layers with a predetermined thickness. In that case, the control unit 500 can acquire the shape data from, for example, an external computer or the like coupled to the three-dimensional shaping apparatus 100. Further, the control unit 500 may, for example, directly acquire the shaping data from an external computer or the like without generating the shaping data. In addition, the shaping data may be generated using, for example, slicer software or the like.

The line width of the shaping material refers to a width in a direction crossing the movement path of the shaping material ejected onto the shaping face 311. The line width is determined by a deposit amount that is the amount of the shaping material ejected from the ejection section 60 per unit movement amount of the ejection section 60 and the height of the shaping material ejected onto the shaping face 311. The deposit amount is changed by an ejection amount that is the amount of the shaping material ejected per unit time from the ejection section 60 and the moving speed of the ejection section 60. For example, the deposit amount is increased when the ejection amount is increased or the moving speed is decreased. The control unit 500 can keep the height of the shaping material substantially constant by ejecting the shaping material while keeping a gap that is a distance in the Z direction between the ejection section 60 and the shaping face 311 constant.

The state observation section 600 makes state observation to observe the state of the heater 35 provided in the plasticizing section 30. The state observation section 600 of this embodiment makes state observation of the heater 35 based on a heater temperature measured or calculated as the actual temperature of the heater 35 and a heater electric power amount measured or calculated as an electric power consumed by the heater 35. The details of the state observation by the state observation section 600 will be described later.

In this embodiment, the measurement of the heater temperature and the heater electric power amount is performed by a sensor section 59 including a temperature sensor and a wattmeter. The temperature sensor of the sensor section 59 may be constituted by, for example, a thermocouple or may be constituted by another contact-type temperature sensor such as a semiconductor temperature sensor or a non-contact-type temperature sensor. In this embodiment, the heater temperature acquired by the temperature sensor of the sensor section 59 is also used for feedback control of the heater 35 by the control unit 500.

The prediction section 700 makes residual service life prediction to predict the residual service life of the heater 35 from the observation result of the heater 35 observed by the state observation section 600. The details of the residual service life prediction by the prediction section 700 will be described later.

The notification section 800 notifies a user of information. The notification section 800 of this embodiment is constituted by a liquid crystal monitor coupled to the control unit 500 and makes a notification of information by displaying visual information on the liquid crystal monitor. The notification section 800 makes a notification of, for example, the control state of the three-dimensional shaping apparatus 100, the shaping state of a three-dimensional shaped article in the middle of shaping, an elapsed time from the start of shaping, or the like as the information. For example, when the three-dimensional shaping apparatus 100 is placed in a housing, the notification section 800 may be disposed at an outer wall face of the housing as a monitor that can be viewed from the outside of the housing.

Figure 4:
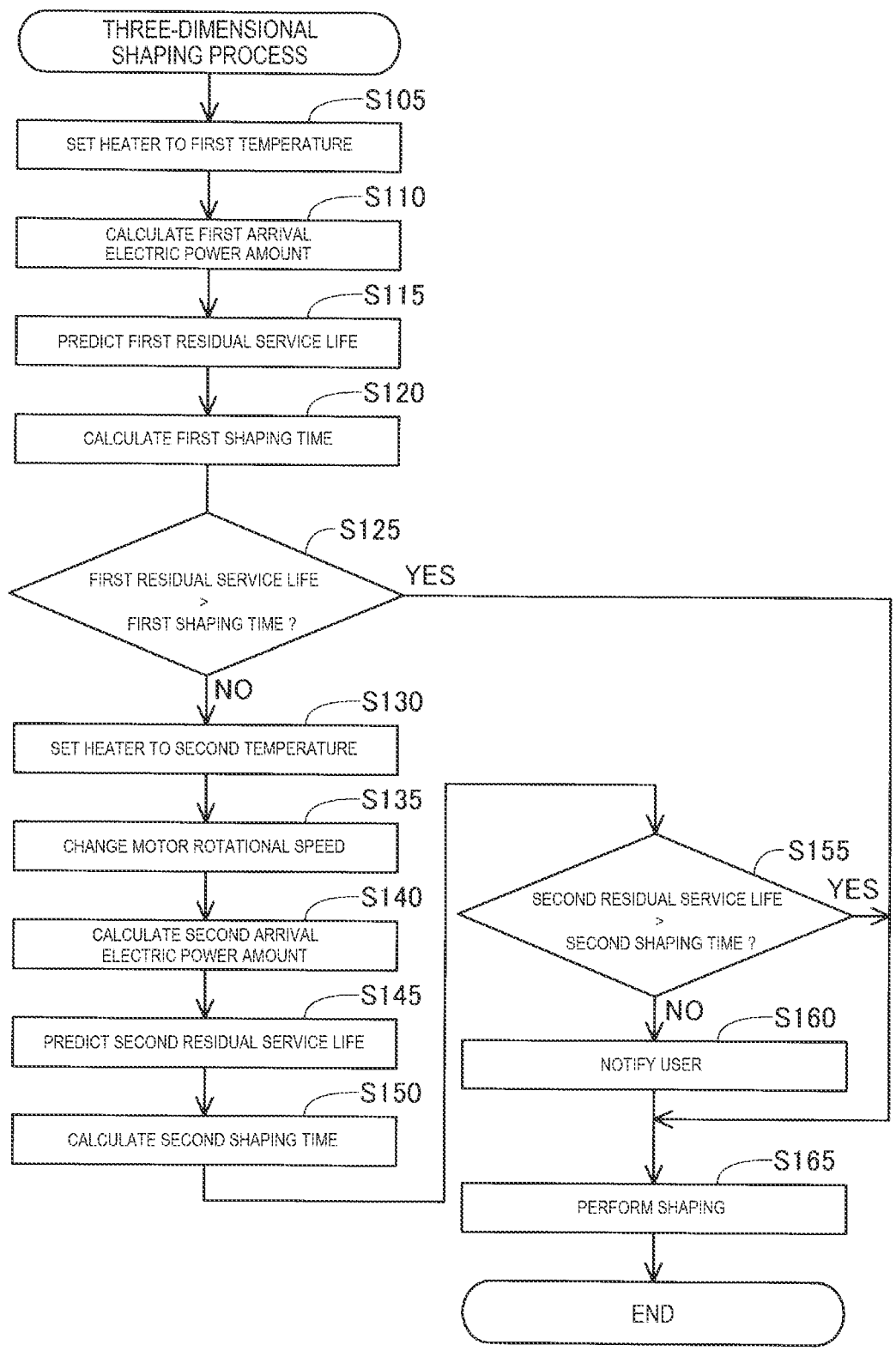
FIG. 4 is a process chart showing a three-dimensional shaping process according to the first embodiment.

FIG. 4 is a process chart showing the three-dimensional shaping process for realizing the three-dimensional shaped article production method in this embodiment. The three-dimensional shaping process is executed by the control unit 500 when a start operation is performed by a user for an operation panel provided in the three-dimensional shaping apparatus 100 or a computer coupled to the three-dimensional shaping apparatus 100. In this embodiment, the control unit 500 acquires the shaping data immediately after the start of the three-dimensional shaping process.

The control unit 500 has a first mode in which the temperature of the heater 35 is set to a first temperature T1 and a second mode in which the temperature of the heater 35 is set to a temperature lower than the first temperature T1 in the three-dimensional shaping process. In this embodiment, the control unit 500 sets the temperature of the heater 35 to a second temperature T2 lower than the first temperature T1 in the second mode. In this embodiment, the control unit 500 generally controls the plasticizing section 30 and the moving mechanism section 400 in the first mode.

In Step S105, the control unit 500 sets a target temperature of the heater 35 of the plasticizing section 30 to a determination temperature and starts electric power supply to the heater 35. The control unit 500 performs feedback control of the heater 35 so that the heater temperature approaches the determination temperature set as the target temperature with reference to the heater temperature acquired by the sensor section 59. In this embodiment, the control unit 500 uses the first temperature T1 as the determination temperature in Step S105, and therefore set the target temperature of the heater 35 to the first temperature T1. According to this, the heater temperature changes toward the first temperature T1 under the control of the control unit 500. For example, when the target temperature of the heater 35 at room temperature is set to 250° C., the heater temperature increases from room temperature toward 250° C. Further, in this embodiment, by execution of Step S105, the control by the control unit 500 is set to the first mode.

In Step S110, the state observation section 600 calculates a first arrival electric power amount. The arrival electric power amount refers to an electric power amount required for the temperature of the heater 35 to arrive at the determination temperature. The first arrival electric power amount refers to an electric power amount required for the temperature of the heater 35 to arrive at the first temperature T1 as the determination temperature. The state observation section 600 of this embodiment makes state observation of the heater 35 by calculating the first arrival electric power amount. The step of observing the state of the heater 35 as Step S110 is sometimes referred to as "first step".

Figure 5:
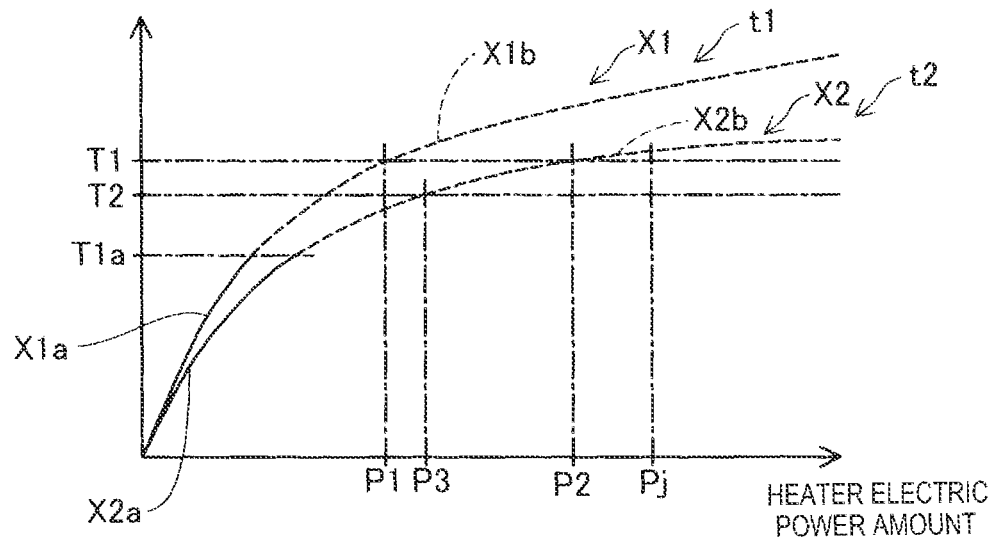
FIG. 5 is a graph in which the horizontal axis represents a heater electric power amount and the vertical axis represents a heater temperature.

FIG. 5 is a graph in which the horizontal axis represents a heater electric power amount and the vertical axis represents a heater temperature. In FIG. 5, a change X1 in the heater electric power amount with respect to the heater temperature at an observation time t1 and a change X2 in the heater electric power amount with respect to the heater temperature at an observation time t2 are shown. The observation time is a time when the state observation is executed, and the observation time t2 is an observation time later than the observation time t1. Specifically, the change X2 at the observation time t2 is measured in the three-dimensional shaping process executed later than the three-dimensional shaping process in which the change X1 at the observation time t1 is measured. As shown in FIG. 5, the first arrival electric power amount at the observation time t1 is an electric power amount P1. On the other hand, the first arrival electric power amount at the observation time t2 is an electric power amount P2 larger than the electric power amount P1. Therefore, at the observation time t2, deterioration of the heater 35 is in progress as compared with that at the observation time t1.

The state observation section 600 of this embodiment calculates the first arrival electric power amount to be predicted at a stage before the heater temperature arrives at the first temperature T1 in Step S110. Specifically, the state observation section 600 measures a change in the heater electric power amount until the heater temperature becomes a temperature T1a lower than the first temperature T1. Further, the state observation section 600 calculates a change in the heater electric power amount when the heater temperature is increased from the temperature T1a to the first temperature T1 based on the change in the heater electric power amount until the heater temperature becomes the temperature T1a. For example, at the observation time t1, a change X1b in the heater electric power amount when the heater temperature is increased from the temperature T1a to a temperature exceeding the first temperature T1 is calculated based on a change X1a in the heater electric power amount until the heater temperature becomes the temperature T1a. That is, the change X1 at the observation time t1 described above is measured by measuring the change X1a and calculating the change X1b. The state observation section 600, for example, approximates the change X1a in the heater electric power amount by an appropriate function and can calculate the change X1b in the heater electric power amount based on the approximated function. Further, in the same manner as in the case at the observation time t1, at the observation time t2, a change X2b in the heater electric power amount when the heater temperature is increased from the temperature T1a to a temperature exceeding the first temperature T1 is calculated based on a change X2a in the heater electric power amount until the heater temperature becomes the temperature T1a. That is, the change X2 at the observation time t2 described above is measured by measuring the change X2a and calculating the change X2b.

In Step S115, the prediction section 700 predicts a first residual service life of the heater 35. The first residual service life refers to a residual service life of the heater 35 when the temperature of the heater 35 is set to the first temperature T1. The prediction section 700 of this embodiment predicts the residual service life of the heater 35 by predicting a time when the arrival electric power amount exceeds a determination value Pj shown in FIG. 5. In this embodiment, the residual service life is predicted as a time until the heater 35 arrives at the end of its service life. Specifically, the residual service life is predicted using the below-mentioned increase history of the arrival electric power amount. Note that the step of predicting the first residual service life as Step S115 is sometimes referred to as "second step".

Figure 6:
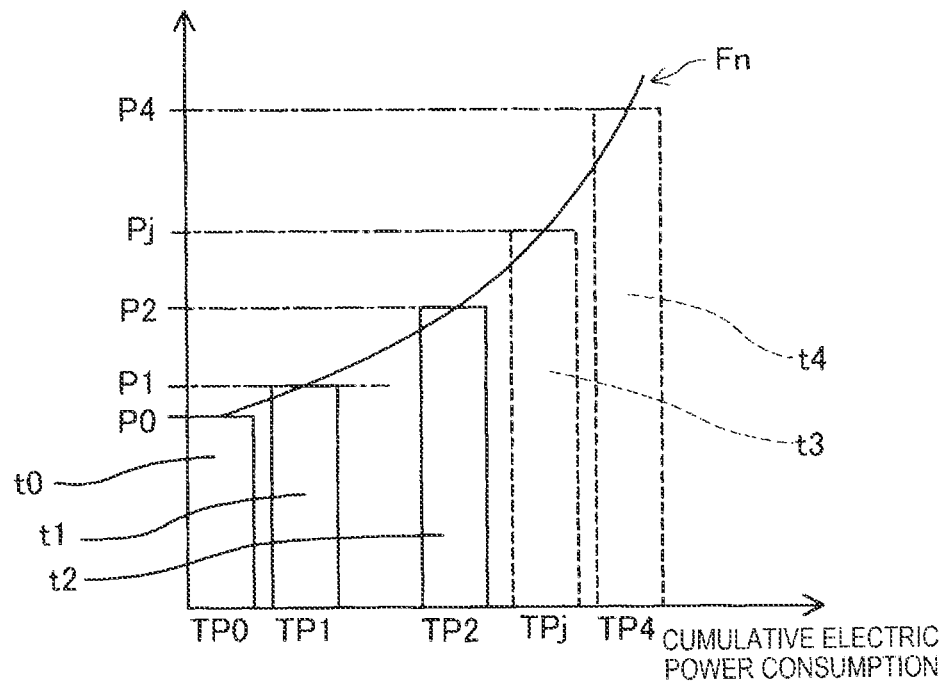
FIG. 6 is a graph showing an increase history of a first arrival electric power amount of the heater.

FIG. 6 is a graph showing an increase history of the first arrival electric power amount of the heater 35. In FIG. 6, a change in the first arrival electric power amount with respect to an increase in the cumulative electric power consumption of the heater 35 is shown. In FIG. 6, a manner in which a cumulative electric power consumption TP1 and a first arrival electric power amount P1 of the heater 35 at the observation time t1 are recorded as a history is shown. Further, a manner in which a cumulative electric power consumption TP2 and a first arrival electric power amount P2 at the observation time t2 are recorded as a history is shown. The prediction section 700 predicts an increase in the first arrival electric power amount after the observation time t2 using the increase history before the observation time t2 when the state of the heater 35 at the observation time t2 is observed in Step S110. The prediction section 700, for example, approximates the increase history before the observation time t2 by a function Fn, and predicts an increase in the first arrival electric power amount with respect to an increase in the cumulative electric power consumption after the observation time t2 based on the function Fn. The prediction section 700 calculates a cumulative electric power consumption TPj of the heater 35 when the first arrival electric power amount becomes the determination value Pj by predicting an increase in the first arrival electric power amount after the observation time t2 in this manner. In FIG. 6, a first arrival electric power amount P0 and a cumulative electric power consumption TP0 when the heater 35 is first operated are recorded as an increase history at an observation time t0. In that case, a relationship between the first arrival electric power amount P0 and the cumulative electric power consumption TP0 at the observation time t0 may be derived from, for example, a theoretical value of the temperature change with respect to the electric power consumption of the heater 35.

Further, the prediction section 700 predicts the first residual service life from a difference between the calculated cumulative electric power consumption TPj and the cumulative electric power consumption TP2 at the observation time t2. In this embodiment, the prediction section 700 calculates the first residual service life by dividing the difference between the cumulative electric power consumption TP2 and the cumulative electric power consumption TPj (TP2−TPj) by the electric power consumption when the heater 35 is operated at the first temperature T1. In the increase history shown in FIG. 6, it is shown that the first arrival electric power amount becomes the determination value Pj at a time t3. Further, for example, when the first arrival electric power amount observed in Step S110 exceeds the determination value Pj, in Step S115, a first arrival electric power amount P4 exceeding the determination value Pj is recorded as the increase history at a time t4 shown in FIG. 6. The cumulative electric power consumption at the time t4 is TP4 that is larger than TPj, and the first residual service life at that time is predicted to be 0.

In Step S120, the control unit 500 calculates a first shaping time. The first shaping time is a shaping time required for shaping a three-dimensional shaped article calculated based on the shaping data and control values when the plasticizing section 30 and the moving mechanism section 400 are controlled in the first mode. For example, even if the shaping time is calculated based on the same shaping data, the calculated shaping time is different between when the moving speed of the ejection section 60 is changed by changing the control value of the moving mechanism section 400 and when the moving speed of the ejection section 60 is not changed. The control unit 500 of this embodiment determines the first shaping time calculated in Step S120 as the below-mentioned first value. Note that in this embodiment, the shaping data are acquired immediately after the start of the three-dimensional shaping process, however, in another embodiment, the shaping data may be acquired at another timing until Step S120 is executed.

In Step S125, the control unit 500 determines whether or not the first residual service life exceeds the first value. That is, in this embodiment, the control unit 500 determines whether or not the first residual service life exceeds the first shaping time.

When it is determined that the first residual service life exceeds the first shaping time in Step S125, in Step S130, the control unit 500 sets the target temperature of the heater 35 to the second temperature T2. According to this, the heater temperature changes toward the second temperature T2 under the control of the control unit 500. Further, by execution of Step S130, the control by the control unit 500 is switched from the first mode to the second mode.

When the heater temperature is the second temperature T2, as compared with a case where the heater temperature is the first temperature T1, the temperature at which the material is plasticized by the plasticizing section 30 decreases. According to this, for example, the viscosity of the shaping material formed by the plasticizing section 30 sometimes increases. Further, by the increase in the viscosity of the shaping material, the fluidity of the shaping material decreases, and therefore, the ejection amount of the shaping material sometimes decreases. In addition, by the decrease in the ejection amount of the shaping material, the deposit amount or the line width of the shaping material sometimes decreases.

In Step S135, the control unit 500 changes the rotational speed of the drive motor 32. The control unit 500 changes the rotational speed of the drive motor 32 so as to compensate the decrease in the ejection amount due to the decrease in the fluidity of the shaping material described above in Step S135. In this embodiment, the control unit 500 increases the rotational speed of the drive motor 32 so as to increase the circulation amount of the material per unit time in the plasticizing section 30, thereby compensating the decrease in the ejection amount.

In another embodiment, the control unit 500 may decrease the rotational speed of the drive motor 32 when the decrease in the ejection amount can be compensated by decreasing the rotational speed of the drive motor 32 in Step S135. For example, by decreasing the rotational speed of the drive motor 32, a period when the shaping material stays in the plasticizing section 30 sometimes becomes long. In that case, the heating time of the shaping material is increased so that the fluidity of the shaping material is improved, whereby the ejection amount is improved in some cases. Further, the control unit 500 may, for example, select a process more suitable for compensating the decrease in the ejection amount from either increasing or decreasing the rotational speed of the drive motor 32 and execute the selected process. In that case, for example, the process may be selected based on a result of an experiment that examines the change in the ejection amount according to a relationship between the type of the shaping material and the rise and fall of the second temperature T2.

In Step S140, the control unit 500 controls the state observation section 600 to calculate a second arrival electric power amount. The second arrival electric power amount refers to an electric power amount required for the temperature of the heater 35 to arrive at the second temperature T2 as the determination temperature. In this embodiment, the second arrival electric power amount is calculated based on the change in the heater electric power amount with respect to the heater temperature shown in FIG. 5 in the same manner as the first arrival electric power amount. For example, the second arrival electric power amount is P3 at the observation time t2 shown in FIG. 5. As shown in FIG. 5, the second temperature T2 is lower than the first temperature T1, and therefore, the second arrival electric power amount P3 at the observation time t2 is smaller than the first arrival electric power amount P2 at the observation time t2.

In Step S145, the control unit 500 controls the prediction section 700 to predict a second residual service life of the heater 35. The second residual service life refers to a residual service life of the heater 35 when the temperature of the heater 35 is set to the second temperature T2.

The prediction section 700 can predict the second residual service life using an increase history of the second arrival electric power amount in the same manner as predicting the first residual service life using the increase history of the first arrival electric power amount in Step S145. That is, the prediction section 700 calculates the cumulative electric power consumption of the heater 35 when the second arrival electric power amount becomes the determination value Pj, and can predict the second residual service life from a difference between the calculated cumulative electric power consumption and the cumulative electric power consumption at the observation time t2. As described above, when the temperature of the heater 35 is set to the second temperature, as compared with a case where the temperature of the heater 35 is set to the first temperature T1, the electric power consumption required for operating the heater 35 becomes small, and therefore, the second residual service life becomes longer than the first residual service life.

In Step S150, the control unit 500 calculates a second shaping time. The second shaping time is a shaping time required for shaping a three-dimensional shaped article calculated based on the shaping data and control values when the plasticizing section 30 and the moving mechanism section 400 are controlled in the second mode. In this embodiment, the shaping time is not different between the first mode and the second mode, and therefore, the second shaping time is equal to the first shaping time. In that case, the control unit 500 may, for example, regard the first shaping time as the second shaping time. The control unit 500 of this embodiment determines the below-mentioned second value based on the second shaping time calculated in Step S150. In this embodiment, the second shaping time is determined as the second value.

In Step S155, the control unit 500 determines whether or not the second residual service life exceeds the second value. That is, in this embodiment, the control unit 500 determines whether or not the second residual service life exceeds the second shaping time.

When it is determined that the second residual service life is equal to or less than the second shaping time in Step S155, in Step S160, the control unit 500 controls the notification section 800 to notify a user of information. Specifically, in Step S160, a user is notified of service life information indicating that the second residual service life is equal to or less than the first value. According to this, for example, the user can replace the deteriorated heater 35 with another heater 35 that is not deteriorated. In Step S160, the control unit 500 may, for example, advise a user to replace the deteriorated heater 35 with another heater 35 that is not deteriorated.

In Step S165, the control unit 500 performs shaping of a three-dimensional shaped article. Step S165 is not only executed after Step S160, but also executed when it is determined that the first residual service life exceeds the first shaping time in Step S125, and also when it is determined that the second residual service life exceeds the second shaping time in Step S155. When it is determined that the first residual service life exceeds the first shaping time in Step S125, the control unit 500 shapes a three-dimensional shaped article in the first mode in Step S165. When it is determined that the second residual service life exceeds the second shaping time in Step S155, the control unit 500 shapes a three-dimensional shaped article in the second mode in Step S165. At that time, the temperature of the heater 35 is set to the second temperature, and the rotational speed of the drive motor 32 is different from the rotational speed in the first mode. Further, when Step S165 is executed after Step S160, for example, if the deteriorated heater 35 has been replaced with another heater by a user, a three-dimensional shaped article is shaped in a state after the heater has been replaced. In another embodiment, when the heater 35 is replaced, the control unit 500 may, for example, shape a three-dimensional shaped article in the first mode in Step S165. Note that the step of shaping a three-dimensional shaped article as Step S165 is sometimes referred to as "third step".

According to the three-dimensional shaping apparatus 100 described above, the control unit 500 shapes a three-dimensional shaped article in the first mode in which the heater 35 is set to the first temperature T1 when the first residual service life exceeds the first value, and shapes a three-dimensional shaped article in the second mode in which the heater 35 is set to the second temperature when the first residual service life is equal to or less than the first value. According to this, when deterioration of the heater 35 is in progress, a three-dimensional shaped article is shaped by setting the heater 35 to a temperature lower than the first temperature T1, and therefore, a period until the heater 35 arrives at the end of its service life is extended. Accordingly, even when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. Further, when deterioration of the heater 35 is not in progress, a three-dimensional shaped article can be shaped without decreasing the set temperature of the heater 35.

Further, in this embodiment, the control unit 500 changes the rotational speed of the drive motor 32 between the first mode and the second mode. Therefore, in the second mode, even when the viscosity of the shaping material is increased due to a decrease in the temperature of the heater 35, by changing the rotational speed of the drive motor 32, a decrease in the ejection amount of the shaping material is suppressed. Accordingly, shaping quality in the second mode is enhanced.

Further, in this embodiment, the state observation section 600 observes the arrival electric power amount of the heater 35 as the state of the heater 35, and the prediction section 700 predicts the residual service life by predicting a time when the arrival electric power amount exceeds the determination value Pj. According to this, the state of the heater 35 can be easily observed when the temperature of the heater 35 is increased. Therefore, the residual service life of the heater 35 can be efficiently predicted by efficiently observing the state of the heater 35.

Further, in this embodiment, the screw 40 rotates around the rotational axis and has the grooved face 42, and the plasticizing section 30 includes the barrel 50 opposed to the grooved face 42. According to this, the plasticizing section 30 can be miniaturized, and therefore, the three-dimensional shaping apparatus 100 can be miniaturized.

Further, in this embodiment, the control unit 500 calculates the first shaping time based on the shaping data and control values when the plasticizing section 30 and the moving mechanism section 400 are controlled in the first mode, and determines the first shaping time as the first value. According to this, the first mode and the second mode are selected based on the determination as to whether or not the first residual service life exceeds the first shaping time. Therefore, even when deterioration of the heater 35 is in progress, a possibility that replacement of the heater 35 is needed in the middle of shaping of a three-dimensional shaped article is further decreased, and deterioration of shaping quality due to suspension or resumption of shaping accompanying the replacement of the heater 35 is further suppressed.

Further, in this embodiment, the control unit 500 calculates the second shaping time required for shaping a three-dimensional shaped article based on the shaping data and control values when the plasticizing section 30 and the moving mechanism section 400 are controlled in the second mode, and determines the second value based on the second shaping time. Further, when the second residual service life is equal to or less than the second value, the control unit 500 controls the notification section 800 to make a notification of service life information indicating that the second residual service life is equal to or less than the second value before shaping the three-dimensional shaped article. According to this, when a user is notified of the service life information, for example, the user can shape the three-dimensional shaped article after replacing the heater 35, the deterioration of which has progressed, with a heater, the deterioration of which has not progressed. In addition, when a notification of the service life information is not made, the three-dimensional shaped article is shaped in the second mode. Therefore, a possibility that replacement of the heater 35 is needed in the middle of shaping of a three-dimensional shaped article is decreased, and deterioration of shaping quality due to suspension or resumption of shaping accompanying the replacement of the heater 35 is suppressed.

Here, the material of the three-dimensional shaped article to be used in the above-mentioned three-dimensional shaping apparatus 100 will be described. In the three-dimensional shaping apparatus 100, for example, a three-dimensional shaped article can be shaped using any of various materials such as a material having thermoplasticity, a metal material, and a ceramic material as a main material. Here, the "main material" means a material serving as a main component for forming the shape of the three-dimensional shaped article and refers to a material whose content ratio is 50 wt % or more in the three-dimensional shaped article. In the above-mentioned shaping material, a material obtained by melting such a main material singly, and a material formed into a paste by melting some components contained together with the main material are included.

When a material having thermoplasticity is used as the main material, the shaping material is formed by plasticization of the material in the plasticizing section 30.

As the material having thermoplasticity, for example, the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive such as a wax, a flame retardant, an antioxidant, or a heat stabilizer, or the like may be mixed. The material having thermoplasticity is plasticized and converted into a molten state by the rotation of the screw 40 and heating by the heater 35 in the plasticizing section 30.

The material having thermoplasticity is desirably injected from the ejection section 60 in a completely molten state by being heated to a temperature equal to or higher than the glass transition point thereof. For example, when an ABS resin is used, the temperature thereof when it is ejected from the ejection section 60 is desirably about 200° C.

In the three-dimensional shaping apparatus 100, in place of the above-mentioned material having thermoplasticity, for example, the following metal material may be used as the main material. In that case, it is desirable that a component that melts when forming the shaping material is mixed in a powder material obtained by pulverizing the following metal material into a powder, and the resulting material is fed to the plasticizing section 30 as a material MR.

Examples of Metal Material single metals of magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, stainless steel, cobalt-chromium-molybdenum, a titanium alloy, a nickel alloy, an aluminum alloy, a cobalt alloy, and a cobalt-chromium alloy In the three-dimensional shaping apparatus 100, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material ejected onto the stage 300 may be cured by sintering.

The powder material of the metal material or the ceramic material to be fed to the material supply section 20 as the material MR may be a mixed material obtained by mixing multiple types of single metal powders or alloy powders or ceramic material powders. Further, the powder material of the metal material or the ceramic material may be coated with, for example, a thermoplastic resin as exemplified above or any other thermoplastic resin. In that case, the material may be configured to exhibit fluidity by melting the thermoplastic resin in the plasticizing section 30.

To the powder material of the metal material or the ceramic material to be fed to the material supply section 20 as the material MR, for example, a solvent as described below can also be added. As the solvent, one type or a combination of two or more types selected from the following solvents can be used.

Examples of Solvent water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; tetra-alkyl ammonium acetates (for example, tetra-butyl ammonium acetate, etc.); ionic liquids such as butyl carbitol acetate, and the like In addition thereto, for example, a binder as described below can also be added to the powder material of the metal material or the ceramic material to be fed to the material supply section 20 as the material MR.

Figure 7:
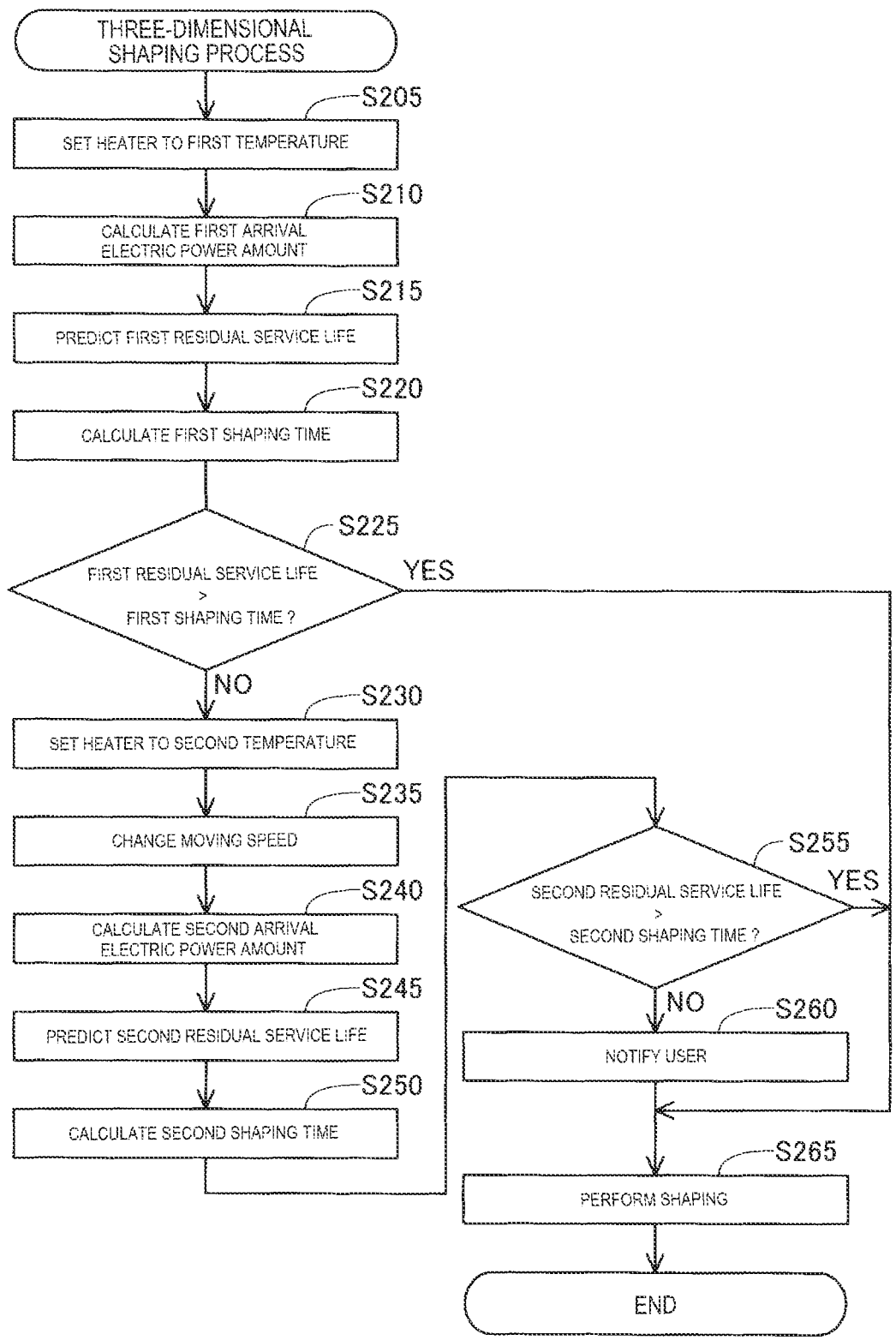
FIG. 7 is a process chart showing a shaping process for a three-dimensional shaped article according to a second embodiment.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or other thermoplastic resins B. Second Embodiment FIG. 7 is a process chart showing a shaping process for a three-dimensional shaped article in the second embodiment. In the second embodiment, the control unit 500 changes the moving speed of the ejection 60 with respect to the stage 300 in the second mode. The configuration of the three-dimensional shaping apparatus 100 in the second embodiment is the same as in the first embodiment, and therefore, the description thereof will be omitted.

In this embodiment, the control unit 500 relatively moves the ejection section 60 with respect to the stage 300 at a first speed in the first mode. The control unit 500 relatively moves the ejection section 60 with respect to the stage 300 at a second speed in the second mode. The second speed is a speed lower than the first speed. The control unit 500 can increase the deposit amount by moving the ejection section 60 at the second speed in the second mode as compared with a case where the ejection section 60 is moved at the first speed. The second speed is determined, for example, by an experiment as a speed capable of compensating the decrease in the deposit amount due to the decrease in the heater temperature in the second mode.

Step S205 to Step S230 are the same as Step S105 to Step S130 shown in FIG. 4, and therefore, the description thereof will be omitted. In Step S220, as the first shaping time, a shaping time when a three-dimensional shaped article is shaped by moving the ejection section 60 at the first speed is calculated.

In Step S235, the control unit 500 changes the moving speed. Specifically, the control unit 500 changes the moving speed of the ejection section 60 from a first moving speed to a second moving speed in Step S235.

The process after Step S240 is the same as the process after Step S140 shown in FIG. 4, and therefore, the description thereof will be omitted. In Step S250, as the second shaping time, a shaping time when a three-dimensional shaped article is shaped by moving the ejection section 60 at the second speed is calculated. The second speed is lower than the first speed, and therefore, in this embodiment, the second shaping time becomes longer than the first shaping time.

According also to the three-dimensional shaping apparatus 100 of the second embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, the ejection section 60 is moved at the first speed in the first mode, and the ejection section 60 is moved at the second speed lower than the first speed in the second mode. According to this, even when the viscosity of the shaping material is increased due to a decrease in the temperature of the heater 35, a decrease in the deposit amount of the shaping material is suppressed, and a decrease in the line width is suppressed. Accordingly, shaping quality in the second mode is enhanced.

C. Third Embodiment

Figure 8:
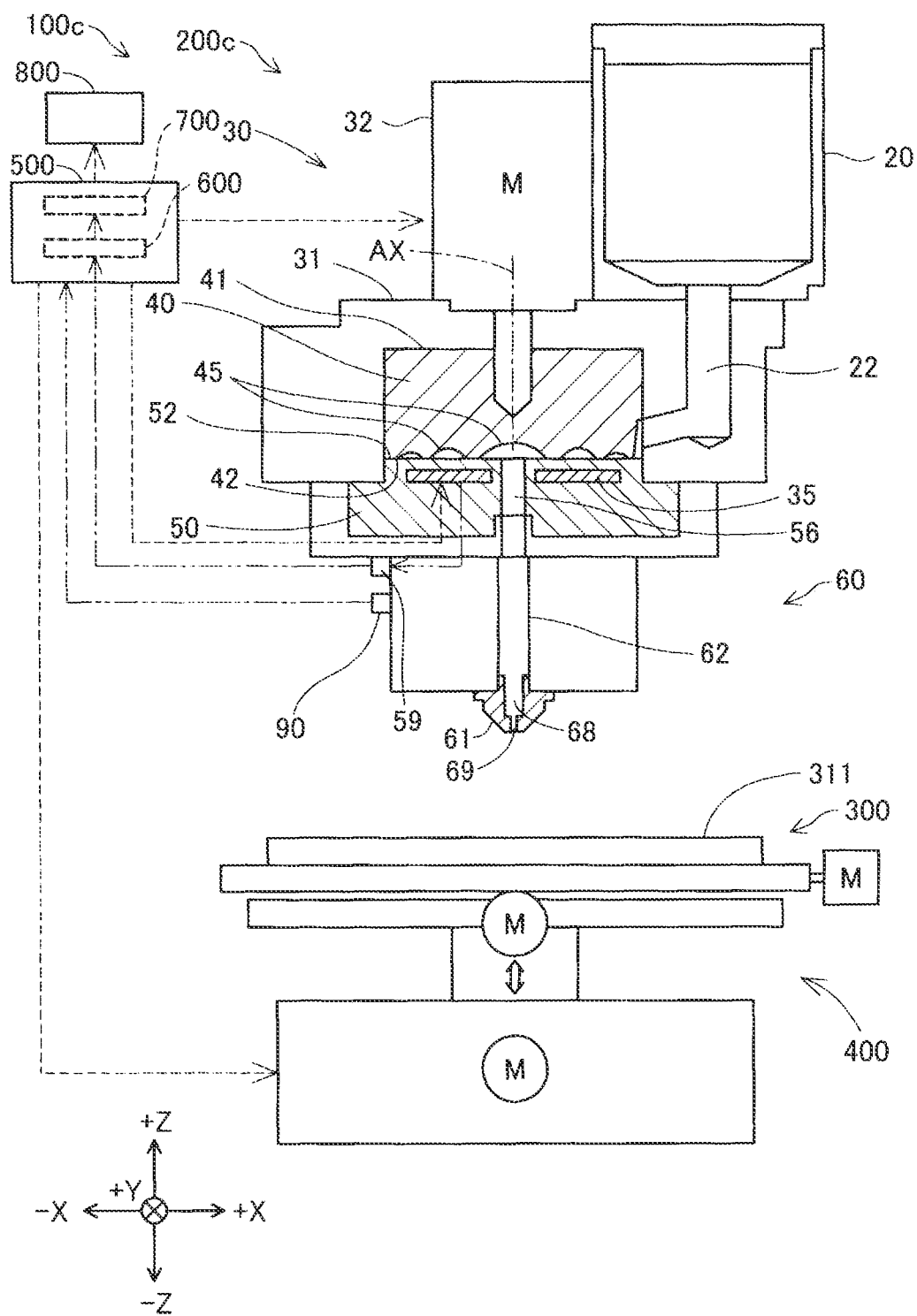
FIG. 8 is a view showing a schematic configuration of a three-dimensional shaping apparatus according to a third embodiment.

FIG. 8 is a view showing a schematic configuration of a three-dimensional shaping apparatus 100c according to a third embodiment. The three-dimensional shaping apparatus 100c includes a temperature acquisition section 90 unlike in the first embodiment. Points that are not particularly described with respect to the three-dimensional shaping apparatus 100c are the same as those of the first embodiment.

The temperature acquisition section 90 acquires an ambient temperature that is a temperature outside the plasticizing section 30. In this embodiment, the temperature acquisition section 90 includes a temperature sensor and acquires a temperature in a room where the three-dimensional shaping apparatus 100c is placed as the ambient temperature. The temperature sensor of the temperature acquisition section 90 may be constituted by, for example, a thermocouple, or may be constituted by another contact-type temperature sensor such as a semiconductor temperature sensor or a non-contact-type temperature sensor. In another embodiment, for example, when the plasticizing section 30 is housed in a housing such as a chamber, the temperature acquisition section 90 may measure the temperature of a space outside the plasticizing section 30 in the housing.

In this embodiment, the control unit 500 executes the same three-dimensional shaping process as the process shown in FIG. 4. The control unit 500 of this embodiment changes the determination value in Step S115 and Step S145 according to the ambient temperature acquired by the temperature acquisition section 90. Specifically, when the ambient temperature is a first ambient temperature, the control unit 500 determines the determination value to be a first determination value, and when the ambient temperature is a second ambient temperature, the control unit 500 determines the determination value to be a second determination value. The second ambient temperature is higher than the first ambient temperature, and the second determination value is lower than the first determination value.

The degree of change in the heater electric power amount with respect to the change in the heater temperature changes according to the ambient temperature of the heater 35. For example, when the ambient temperature is the second ambient temperature, as compared with a case where the ambient temperature is the first ambient temperature, the heater electric power amount required for realizing the same heater temperature decreases. Therefore, when the ambient temperature is the second ambient temperature, as compared with a case where the ambient temperature is the first ambient temperature, there is a possibility that the residual service life is predicted to be apparently longer. In this embodiment, the determination value is determined according to the ambient temperature as described above, and therefore, the effect of the ambient temperature is added to the prediction of the residual service life. Note that the first determination value or the second determination value is predetermined, for example, based on a result of an experiment that examines a change in the arrival electric power amount with respect to a change in the ambient temperature.

According also to the three-dimensional shaping apparatus 100c of the third embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, when the ambient temperature is the second ambient temperature higher than the first ambient temperature, the control unit 500 determines the determination value to be the second determination value lower than the first determination value. According to this, the effect of the ambient temperature is added to the prediction of the residual service life of the heater 35 by the prediction section 700, and the residual service life is more appropriately predicted. Therefore, a possibility that replacement of the heater 35 is needed in the middle of shaping of a three-dimensional shaped article is further decreased, and deterioration of shaping quality due to suspension or resumption of shaping accompanying the replacement of the heater 35 is further suppressed.

D. Fourth Embodiment

Figure 9:
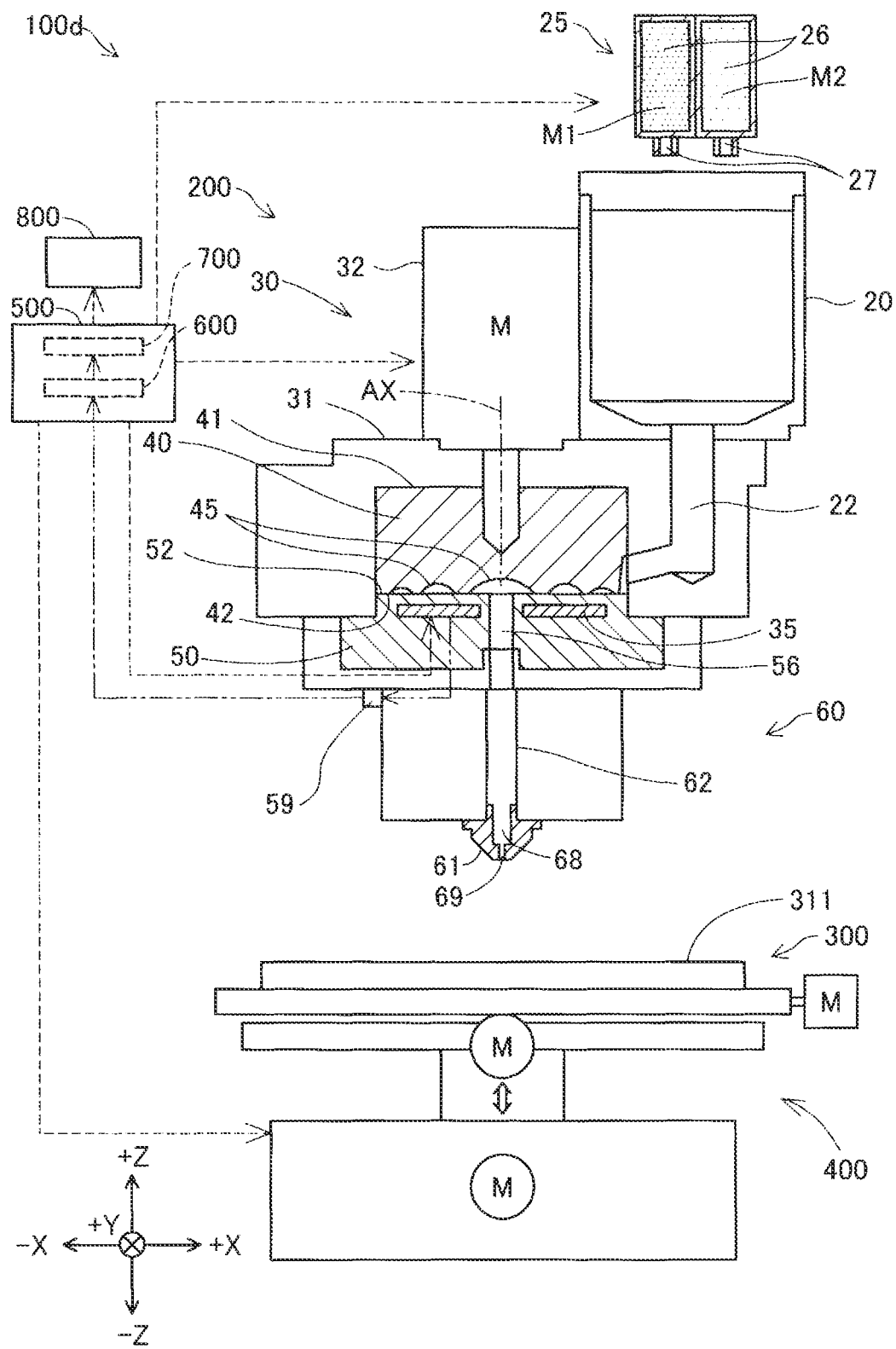
FIG. 9 is a view showing a schematic configuration of a three-dimensional shaping apparatus according to a fourth embodiment.

FIG. 9 is a view showing a schematic configuration of a three-dimensional shaping apparatus 100d according to a fourth embodiment. The three-dimensional shaping apparatus 100d includes a material storage section 25 unlike in the first embodiment. Further, in the three-dimensional shaping apparatus 100d, the control unit 500 acquires first shaping data and second shaping data. In addition, the control unit 500 shapes a three-dimensional shaped article according to the second shaping data before shaping the three-dimensional shaped article according to the first shaping data in the second mode. Points that are not particularly described with respect to the three-dimensional shaping apparatus 100d are the same as those of the first embodiment.

The material storage section 25 stores the material to be supplied to the material supply section 20. The material storage section 25 includes a storage portion 26 and a material supply port 27. The material storage section 25 is disposed above the material supply section 20. In this embodiment, in the storage portion 26, a first material M1 and a second material M2 which are materials of different types are stored without mixing. The material supply port 27 is an opening provided below the storage portion 26, and its opening and closing are controlled by the control unit 500. The material storage section 25 relatively moves along the horizontal direction with respect to the material supply section 20 and supplies the first material M1 or the second material M2 to the material supply section 20 through the material supply port 27 under the control of the control unit 500. The first material M1 is a material having a first glass transition temperature. The second material M2 is a material having a second glass transition temperature lower than the first glass transition temperature. In this embodiment, the first material M1 is an ABS resin formed into a pellet shape, and the second material M2 is a PP resin formed into a pellet shape.

The control unit 500 of this embodiment acquires first shaping data and second shaping data. The first shaping data are shaping data for shaping a three-dimensional shaped article using the first material. The second shaping data are shaping data for shaping a three-dimensional shaped article using the second material. A three-dimensional shaped article shaped according to the first shaping data is sometimes referred to as a first shaped article, and a three-dimensional shaped article shaped according to the second shaping data is sometimes referred to as a second shaped article. In this embodiment, the first shaping data and the second shaping data each include material information representing the types of materials to be used in shaping. In another embodiment, the first shaping data and the second shaping data need not include material information. In that case, for example, material information existing apart from the first shaping data and the second shaping data may be linked to the first shaping data and the second shaping data.

As described above, the second glass transition temperature of the second shaping material is lower than the first glass transition temperature of the first shaping material, and therefore, even in the second mode in which the temperature of the heater 35 is set to the second temperature T2, the second shaping material is more easily plasticized than the first shaping material. Therefore, in the second mode, the second shaped article is more likely to be efficiently shaped with high accuracy as compared with the first shaped article.

Figure 10:
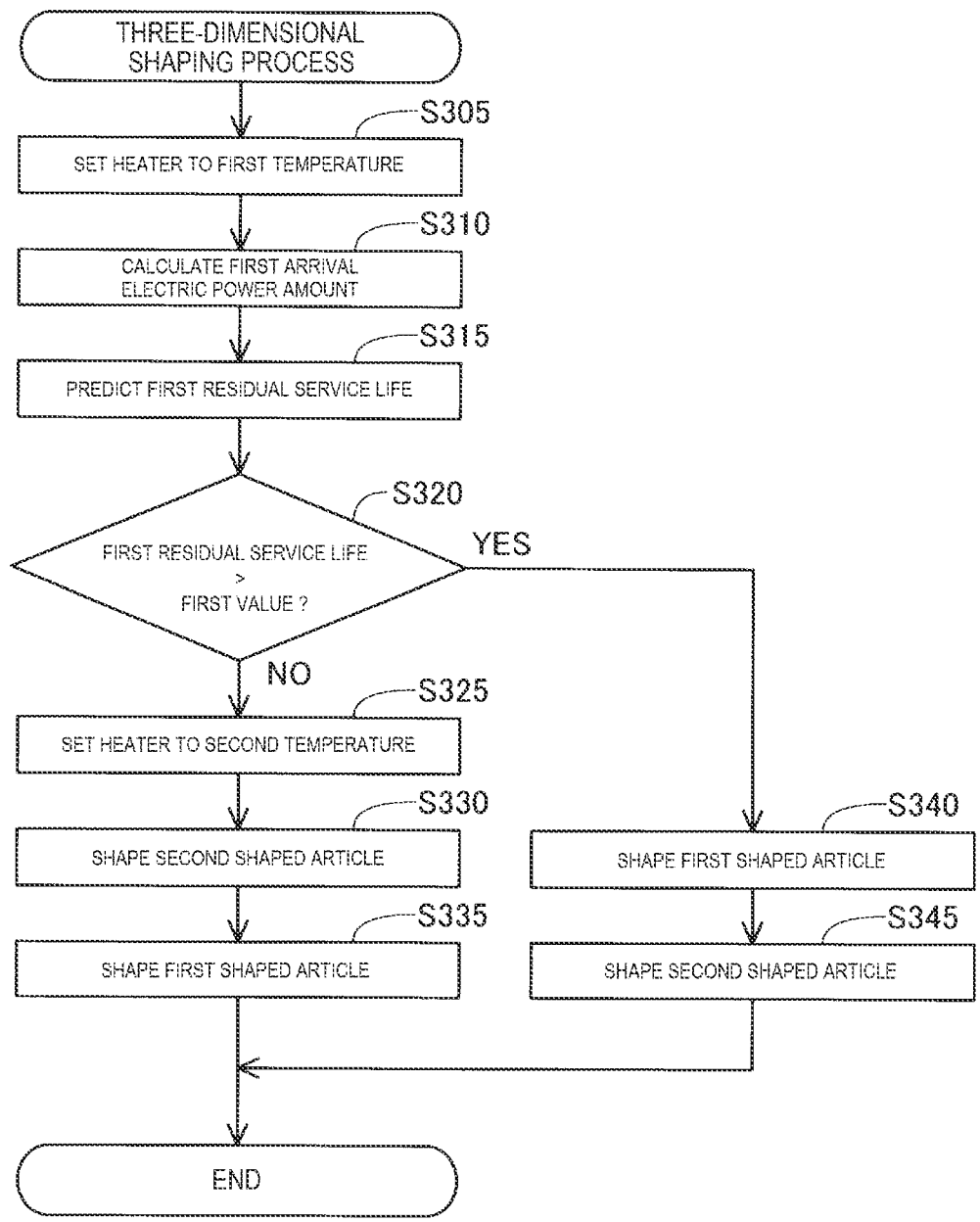
FIG. 10 is a process chart showing a shaping process for a three-dimensional shaped article according to the fourth embodiment.

FIG. 10 is a process chart showing a shaping process for a three-dimensional shaped article in the fourth embodiment. Step S305 to Step S315 in FIG. 10 are the same as Step S105 to Step S115 in FIG. 4, and therefore, the description thereof will be omitted. Further, in this embodiment, the control unit 500 does not calculate the first shaping time after a process for predicting a first residual service life of Step S315 unlike in the first embodiment.

In Step S320, the control unit 500 determines whether or not a first residual service life is larger than the first value. In this embodiment, the first value is predetermined as a sufficiently long shaping time in shaping of a three-dimensional shaped article using the three-dimensional shaping apparatus 100d.

When it is determined that the first residual service life is equal to or less than the first value in Step S320, in Step S325, the control unit 500 sets the temperature of the heater 35 to the second temperature T2 in the same manner as in Step S130 shown in FIG. 4. By executing Step S325, the control by the control unit 500 is switched from the first mode to the second mode in the same manner as in Step S120 shown in FIG. 4.

In Step S330, the control unit 500 shapes the second shaped article. Thereafter, in Step S335, the control unit 500 shapes the first shaped article. Therefore, in that case, the control unit 500 shapes the three-dimensional shaped article according to the second shaping data before shaping the three-dimensional shaped article according to the first shaping data.

When it is determined that the first residual service life is larger than the first value in Step S320, in Step S340, the control unit 500 shapes the first shaped article in the first mode. Thereafter, in Step S345, the control unit 500 shapes the second shaped article in the first mode.

The control unit 500 may shape the second shaped article or the first shaped article by changing the rotational speed of the drive motor 32 or the moving speed of the ejection section 60 in the same manner as in the first embodiment or the second embodiment in Step S330 or Step S335.

According also to the three-dimensional shaping apparatus 100d of the fourth embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, the control unit 500 shapes the second shaped article before shaping the first shaped article in the second mode. According to this, a possibility that replacement of the heater 35 is needed in the middle of shaping of the second shaped article is decreased as compared with a case where the second shaped article is shaped after the first shaped article. Accordingly, the second shaped article that is likely to be efficiently shaped with high accuracy in the second mode is preferentially shaped, and the shaping accuracy and shaping efficiency of the second shaped article are enhanced.

E. Fifth Embodiment

Figure 11:
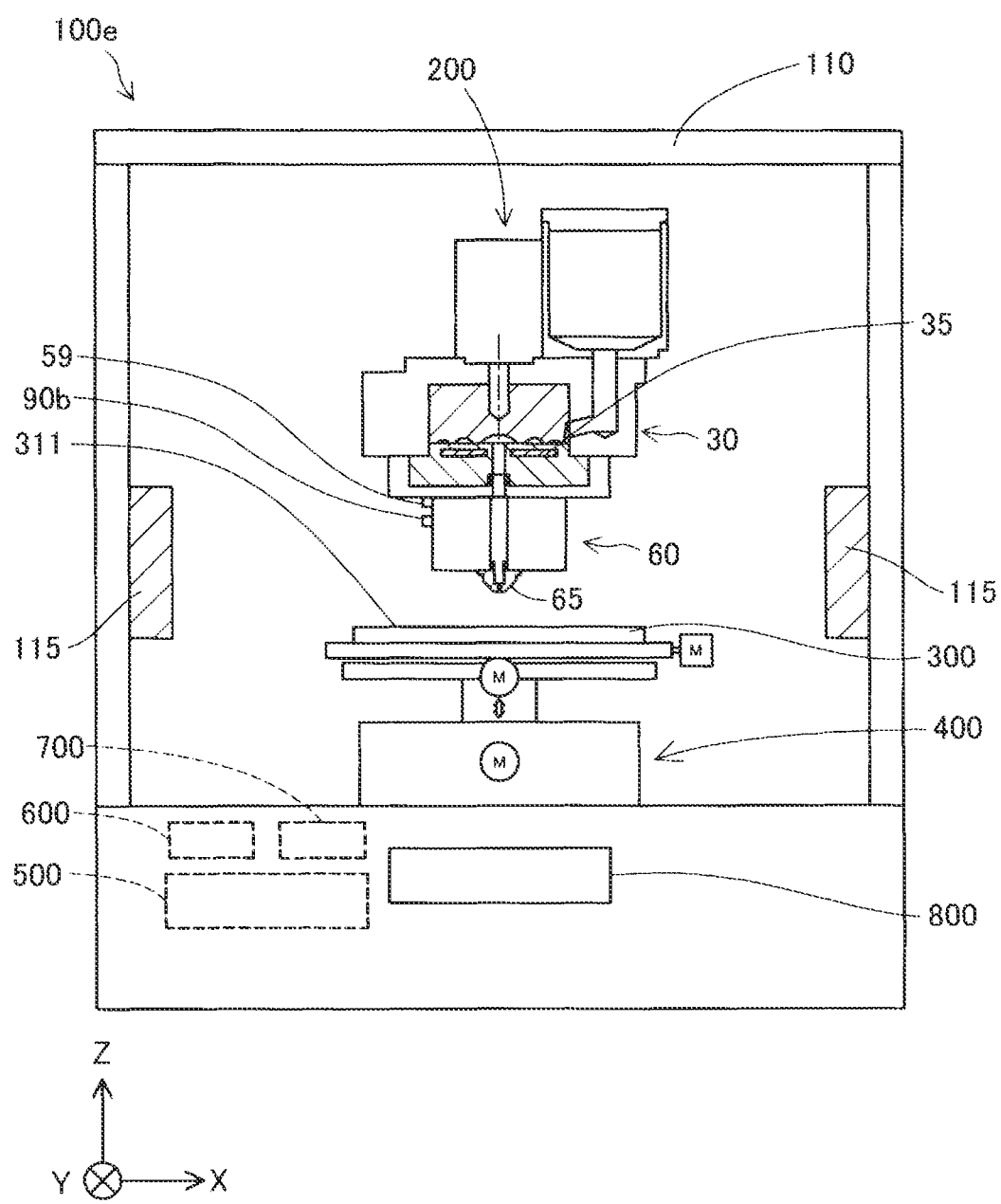
FIG. 11 is a view showing a schematic configuration of a three-dimensional shaping apparatus according to a fifth embodiment.

FIG. 11 is a view showing a schematic configuration of a three-dimensional shaping apparatus 100e according to a fifth embodiment. The three-dimensional shaping apparatus 100e of this embodiment includes a chamber 110 unlike in the first embodiment. Further, the three-dimensional shaping apparatus 100e includes a temperature acquisition section 90b and a chamber heating section 115 in the chamber 110. Points that are not particularly described with respect to the three-dimensional shaping apparatus 100e are the same as those of the first embodiment.

The chamber 110 is a housing that houses part of the three-dimensional shaping apparatus 100e. In this embodiment, in the chamber 110, the shaping unit 200, the stage 300, and the moving mechanism section 400 are housed. In the chamber 110, for example, an opening portion, a door that opens and closes the opening portion, or the like may be provided. In that case, a user can take out a shaped article in the chamber 110 from the opening portion by opening the door to bring the opening portion into an open state.

The temperature acquisition section 90b is constituted by the same temperature sensor as the temperature acquisition section 90 in the second embodiment. The temperature acquisition section 90b acquires a temperature in the chamber 110.

The chamber heating section 115 is provided in the chamber 110. The chamber heating section 115 heats a space in the chamber 110. The chamber heating section 115, for example, may be constituted by a heater that heats the inside of the chamber 110 or may be constituted by a circulation device that circulates air inside and outside the chamber 110 while taking in heated air from the outside of the chamber 110. The chamber heating section 115 of this embodiment is controlled by the control unit 500. The control unit 500 adjusts the temperature inside the chamber 110 by adjusting the output of the chamber heating section 115 while referring to the temperature acquired by the temperature acquisition section 90b.

Figure 12:
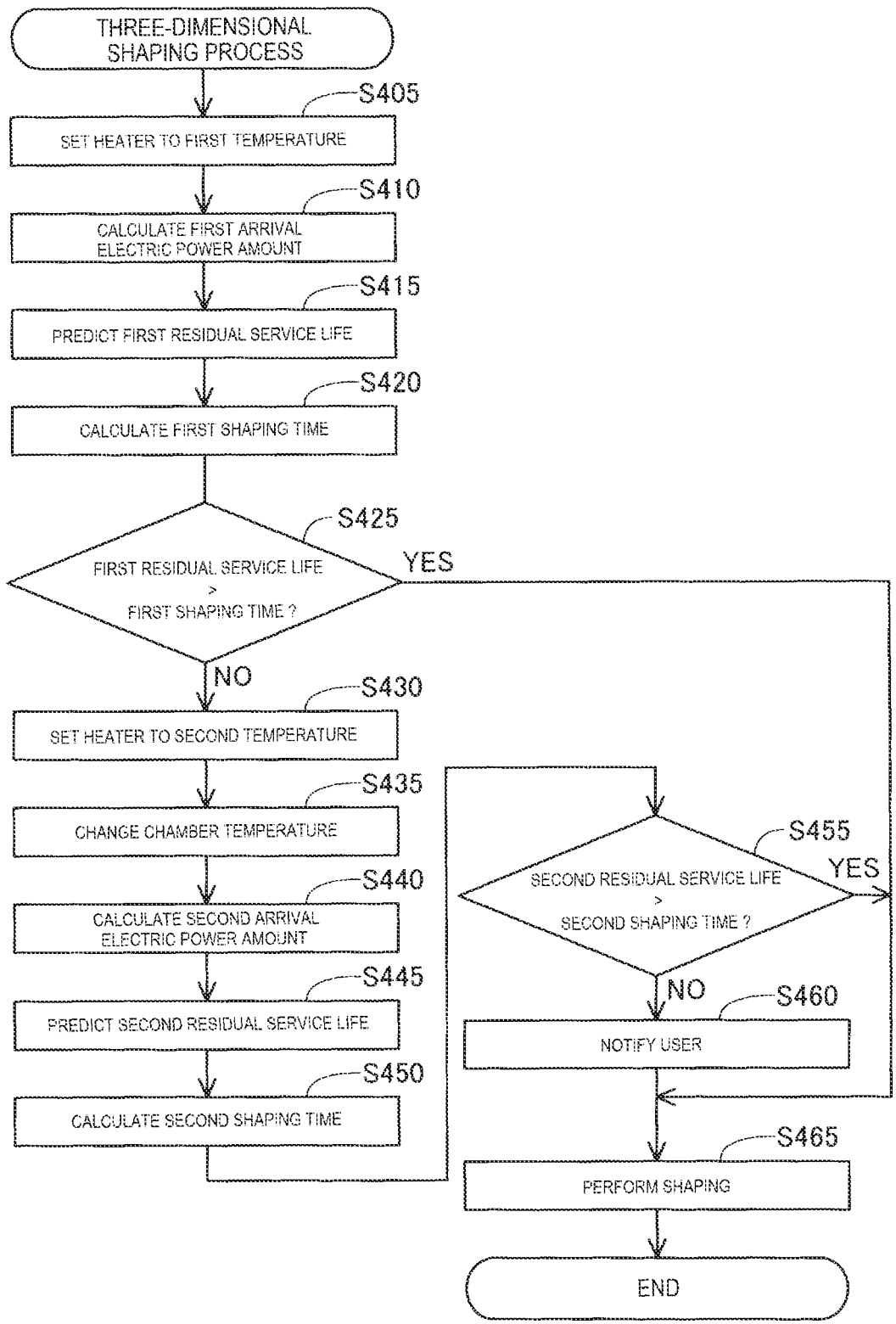
FIG. 12 is a process chart showing a shaping process for a three-dimensional shaped article according to the fifth embodiment.

FIG. 12 is a process chart showing a shaping process for a three-dimensional shaped article in the fifth embodiment. In this embodiment, the control unit 500 changes the output of the chamber heating section 115 between the first mode and the second mode unlike in the first embodiment. Step S405 to Step S430 in FIG. 12 are the same as Step S105 to Step S130 in FIG. 4, and therefore, the description thereof will be omitted. Further, the process after Step S440 is the same as the process after Step S140 shown in FIG. 4, and therefore, the description thereof will be omitted.

In Step S435, the control unit 500 changes the output of the chamber heating section 115 so as to change the temperature in the chamber 110. Specifically, the control unit 500 increases the output of the chamber heating section 115 so as to increase the temperature in the chamber 110 in Step S435.

When the heater temperature is the second temperature T2, the temperature of the shaping material to be ejected from the ejection section 60 decreases as compared with a case where the heater temperature is the first temperature T1. Due to this, the shaping material ejected onto the shaping face 311 in the second mode is more quickly solidified than in the first mode. Therefore, in the second mode, adhesion between the shaping materials on the shaping face 311 decreases, and the strength of the three-dimensional shaped article decreases in some cases. The control unit 500 can suppress the decrease in the adhesion between the shaping materials by increasing the temperature in the chamber 110 in Step S435 so as to keep the temperature of the shaping material on the shaping face 311 in the second mode high. The temperature in the chamber 110 in the second mode is determined, for example, by an experiment as a temperature capable of compensating the decrease in the adhesion due to the decrease in the heater temperature in the second mode.

According also to the three-dimensional shaping apparatus 100e of the fifth embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, the output of the chamber heating section 115 in the second mode is controlled to be higher than the output of the chamber heating section 115 in the first mode. According to this, even when the temperature of the shaping material to be ejected from the ejection section 60 is decreased due to the decrease in the temperature of the heater 35, the decrease in the adhesion between the shaping materials on the shaping face 311 is suppressed. Accordingly, the strength of a three-dimensional shaped article shaped in the second mode is improved.

F. Sixth Embodiment

Figure 13:
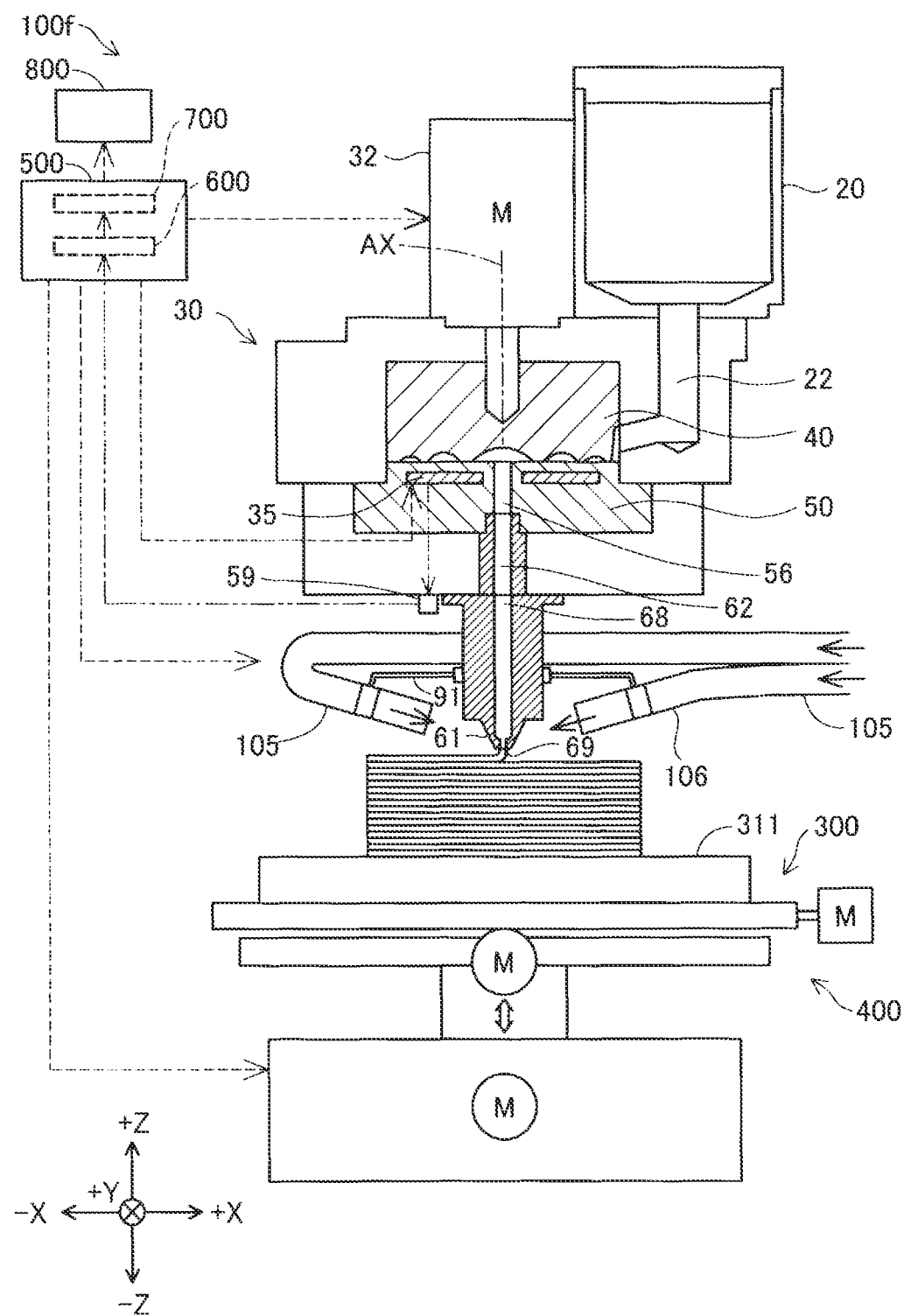
FIG. 13 is a view showing a schematic configuration of a three-dimensional shaping apparatus according to a sixth embodiment.

FIG. 13 is a view showing a schematic configuration of a three-dimensional shaping apparatus 100f according to a sixth embodiment. The three-dimensional shaping apparatus 100f of this embodiment includes an air blowing section 105 unlike in the first embodiment. Points that are not particularly described with respect to the three-dimensional shaping apparatus 100f are the same as those of the first embodiment.

The air blowing section 105 includes four tubes 106 arranged at equal angle intervals around the ejection section 60. In FIG. 12, only two tubes 106 are shown for the sake of illustration. These tubes 106 are, for example, fixed to the ejection section 60 or the screw case 31 through a clamp 91 or the like. Into each tube 106, compressed air is introduced, and air is blown from a tip of each tube 106 toward the shaping material ejected onto the shaping face 311 from the ejection section 60. The air blowing section 105 can decrease the temperature of the shaping material on the shaping face 311 and promote solidification of the shaping material by blowing air to the shaping material on the shaping face 311. Further, the air blowing section 105 can adjust the solidification of the shaping material by adjusting the amount of air blown to the shaping material so as to adjust the rate of decreasing the temperature of the shaping material. The amount of air blown from the air blowing section 105 is adjusted by the control unit 500. Specifically, the control unit 500 adjusts the amount of blown air by adjusting the amount of compressed air introduced into the tube 106. Note that, for example, when a sensor that measures the temperature of the shaping material on the shaping face 311 is provided, the control unit 500 may adjust the amount of blown air according to the temperature of the shaping material on the shaping face 311.

Figure 14:
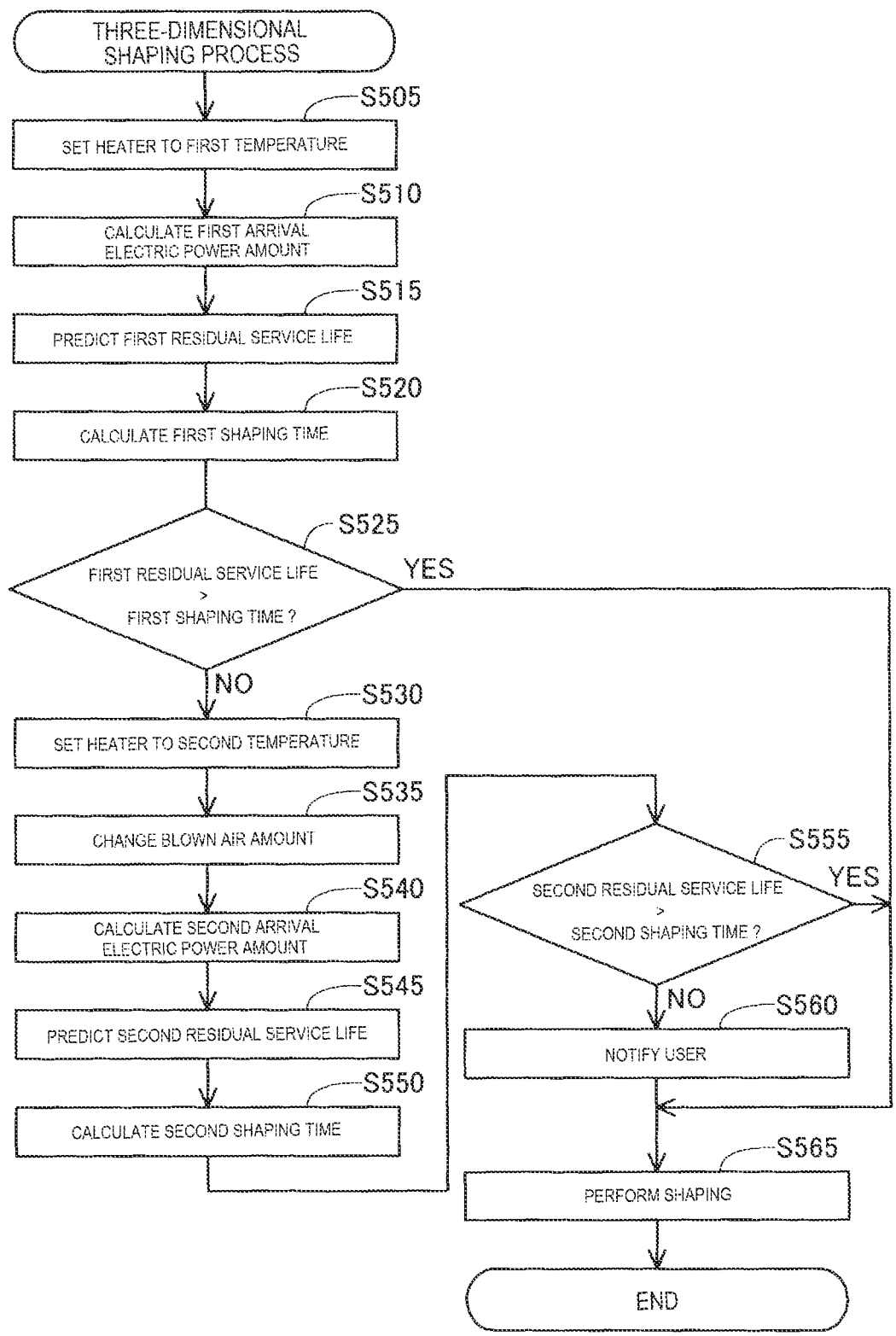
FIG. 14 is a process chart showing a shaping process for a three-dimensional shaped article according to the sixth embodiment.

FIG. 14 is a process chart showing a shaping process for a three-dimensional shaped article in the sixth embodiment. In this embodiment, the control unit 500 changes the amount of blown air from the air blowing section 105 between the first mode and the second mode unlike in the first embodiment. Step S505 to Step S530 in FIG. 14 are the same as Step S105 to Step S130 in FIG. 4, and therefore, the description thereof will be omitted. Further, the process after Step S540 is the same as the process after Step S140 shown in FIG. 4, and therefore, the description thereof will be omitted.

In Step S535, the control unit 500 changes the output of the air blowing section 105. Specifically, the control unit 500 decreases the output of the air blowing section 105 so as to decrease the amount of blown air to the shaping material on the shaping face 311 in Step S535. The control unit 500 decreases the amount of blown air in Step S535 so as to slow down the decrease in the temperature of the shaping material on the shaping face 311 in the second mode, and can suppress the decrease in the adhesion between the shaping materials. The amount of blown air in the second mode is determined, for example, by an experiment as an amount of blown air capable of compensating the decrease in the adhesion due to the decrease in the heater temperature in the second mode.

According also to the three-dimensional shaping apparatus 100f of the sixth embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, the amount of blown air in the second mode is controlled so as to be smaller than the amount of blown air in the first mode. According to this, even when the temperature of the shaping material to be ejected from the ejection section 60 is decreased due to the decrease in the temperature of the heater 35, the decrease in the adhesion between the shaping materials on the shaping face 311 is suppressed. Accordingly, the strength of a three-dimensional shaped article shaped in the second mode is improved.

G. Seventh Embodiment

Figure 15:
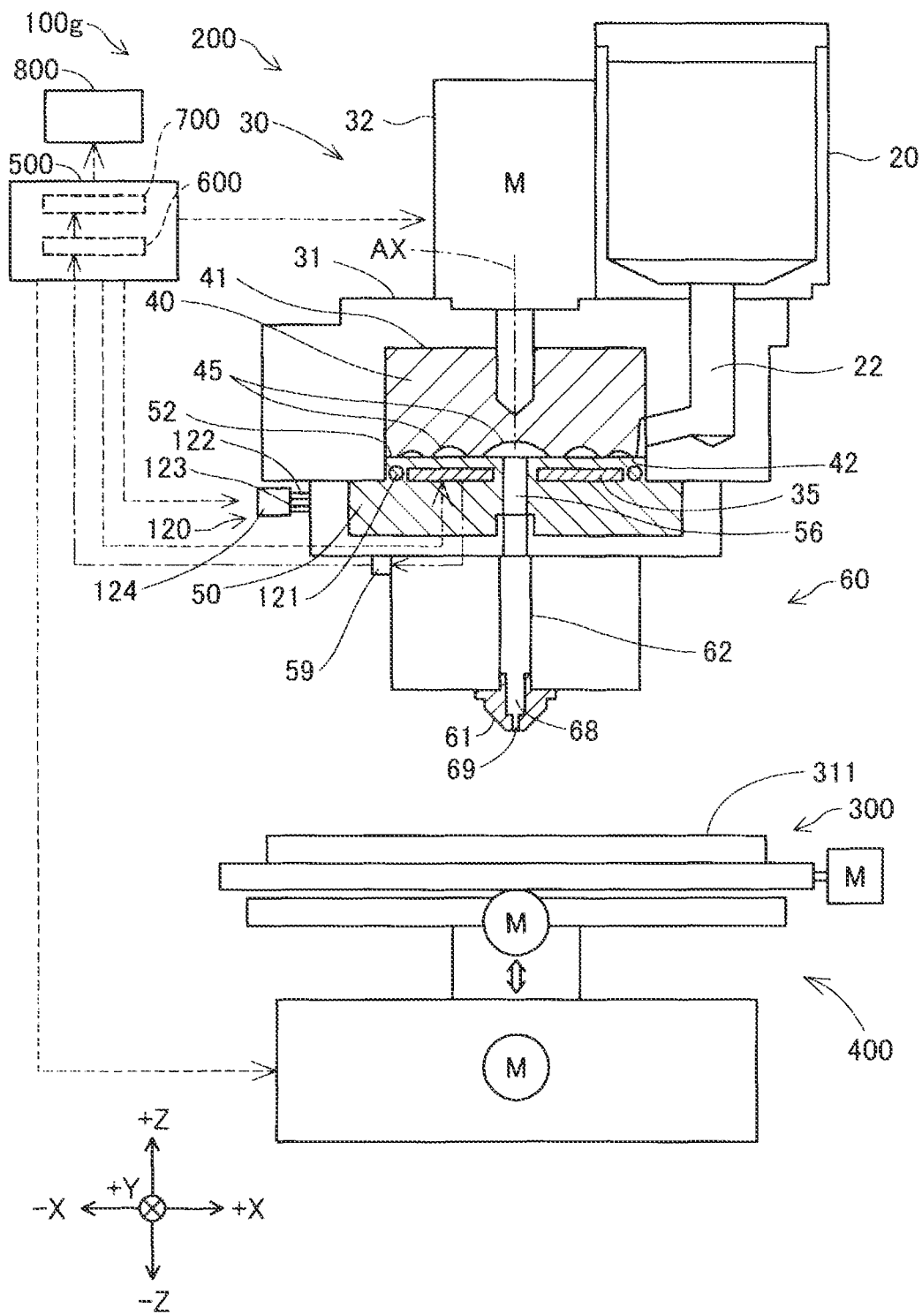
FIG. 15 is a view showing a schematic configuration of a three-dimensional shaping apparatus according to a seventh embodiment.

FIG. 15 is a view showing a schematic configuration of a three-dimensional shaping apparatus 100g according to a seventh embodiment. The three-dimensional shaping apparatus 100g of this embodiment includes a cooling section 120 for cooling the plasticizing section 30 unlike in the first embodiment. Points that are not particularly described with respect to the three-dimensional shaping apparatus 100g are the same as those of the first embodiment.

The cooling section 120 of this embodiment includes a refrigerant flow channel 121 provided along an outer circumference of the barrel 50, an inlet portion 122 from which a refrigerant is introduced into the refrigerant flow channel 121, an outlet portion 123, which communicates with the refrigerant flow channel 121, and from which the refrigerant is discharged outside the refrigerant flow channel 121, and a refrigerant circulation device 124. The refrigerant circulation device 124 of this embodiment includes a pump and a freezing machine for cooling the refrigerant (both not shown). In another embodiment, the refrigerant flow channel 121 need not be provided in the barrel 50, or may be provided in, for example, the screw 40.

The cooling section 120 is controlled by the control unit 500. Specifically, the control unit 500 cools the refrigerant in the refrigerant circulation device 124 while circulating the refrigerant inside and outside the refrigerant flow channel 121 through the inlet portion 122 and the outlet portion 123 by driving the refrigerant circulation device 124. The control unit 500 cools the plasticizing section 30 by circulating the refrigerant in this manner.

The control unit 500 can adjust the temperature of the plasticizing section 30 by adjusting the output of the cooling section 120. For example, an excessive increase in temperature in the plasticizing section 30 is suppressed by increasing the output of the cooling section 120. Further, when the refrigerant flow channel 121 is provided along the outer circumference of the barrel 50 as in this embodiment, the control unit 500 can keep the temperature in the vicinity of the outer circumference of the barrel 50 low and can keep the temperature in the vicinity of a central portion of the barrel 50 high while suppressing an increase in the temperature of the barrel 50 as a whole by adjusting the output of the cooling section 120. When the output of the cooling section 120 is adjusted, the control unit 500, for example, may adjust the flow rate of the refrigerant in the cooling section 120 by adjusting the output of the pump of the refrigerant circulation device 124 or may adjust the temperature of the refrigerant by adjusting the output of the freezing machine.

Figure 16:
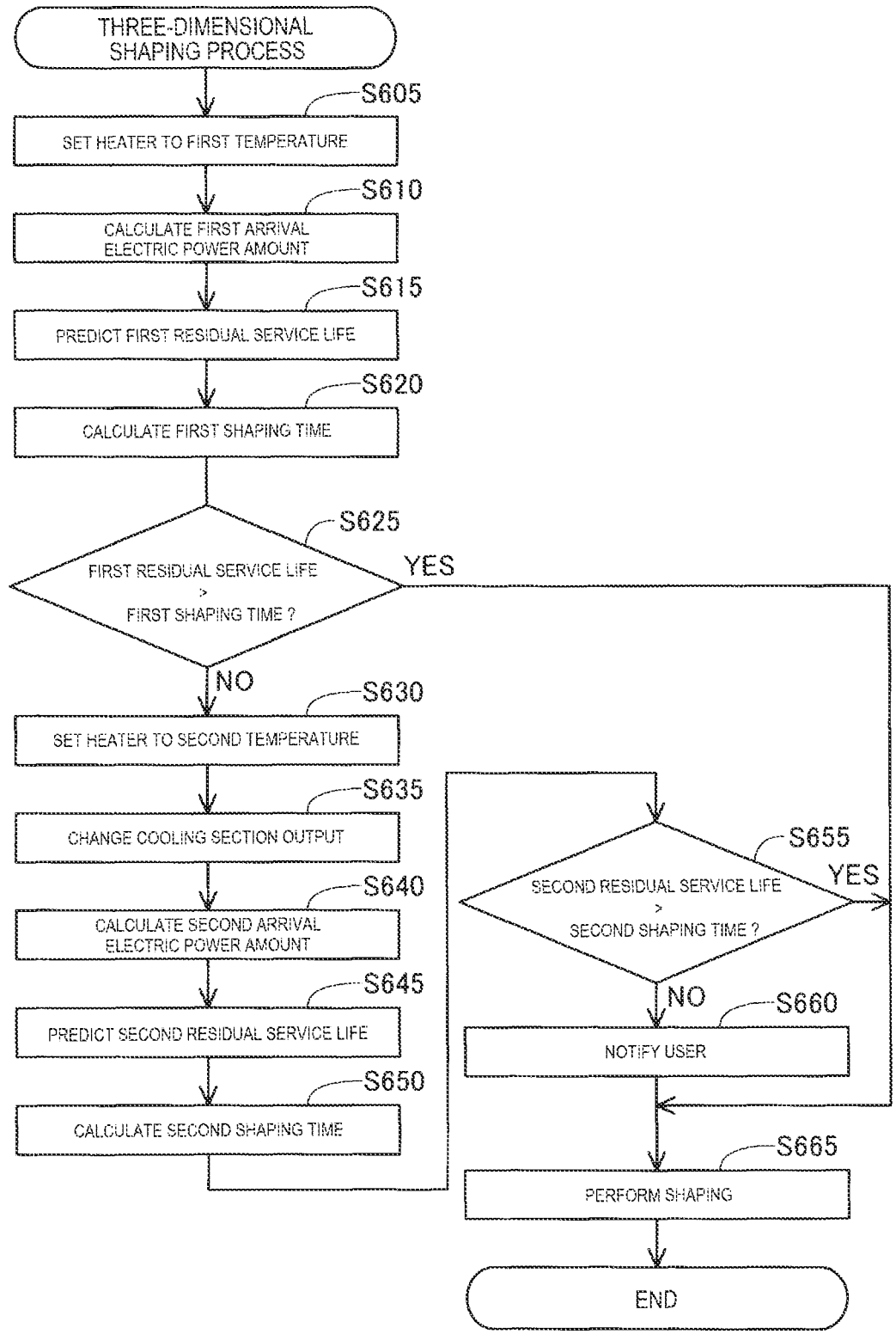
FIG. 16 is a process chart showing a shaping process for a three-dimensional shaped article according to the seventh embodiment.

FIG. 16 is a process chart showing a shaping process for a three-dimensional shaped article in the seventh embodiment. In this embodiment, the control unit 500 changes the output of the cooling section 120 between the first mode and the second mode unlike in the first embodiment. Step S605 to Step S630 in FIG. 16 are the same as Step S105 to Step S130 in FIG. 4, and therefore, the description thereof will be omitted. Further, the process after Step S640 is the same as the process after Step S140 in FIG. 4, and therefore, the description thereof will be omitted.

In Step S635, the control unit 500 changes the output of the cooling section 120. Specifically, the control unit 500 decreases the output of the cooling section 120 so as to decrease the cooling efficiency of the plasticizing section 30 by the cooling section 120 in Step S635. The control unit 500 decreases the output of the cooling section 120 in Step S635 so as to prevent an excessive decrease in the temperature of the plasticizing section 30 in the second mode, and can suppress the decrease in the temperature of the shaping material. The output of the cooling section 120 in the second mode is determined, for example, by an experiment as an output capable of compensating the decrease in the temperature of the plasticizing section 30 in the second mode.

According also to the three-dimensional shaping apparatus 100g of the seventh embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, the output of the cooling section 120 in the second mode is controlled so as to be lower than the output of the cooling section 120 in the first mode. According to this, even when the temperature of the heater 35 is decreased, an excessive decrease in the temperature of the plasticizing section 30 can be suppressed. Accordingly, a decrease in the temperature of the shaping material to be plasticized by the plasticizing section 30 is suppressed in the second mode, and an increase in the viscosity of the shaping material or a decrease in the ejection amount due to an increase in the viscosity is suppressed.

H. Eighth Embodiment

Figure 17:
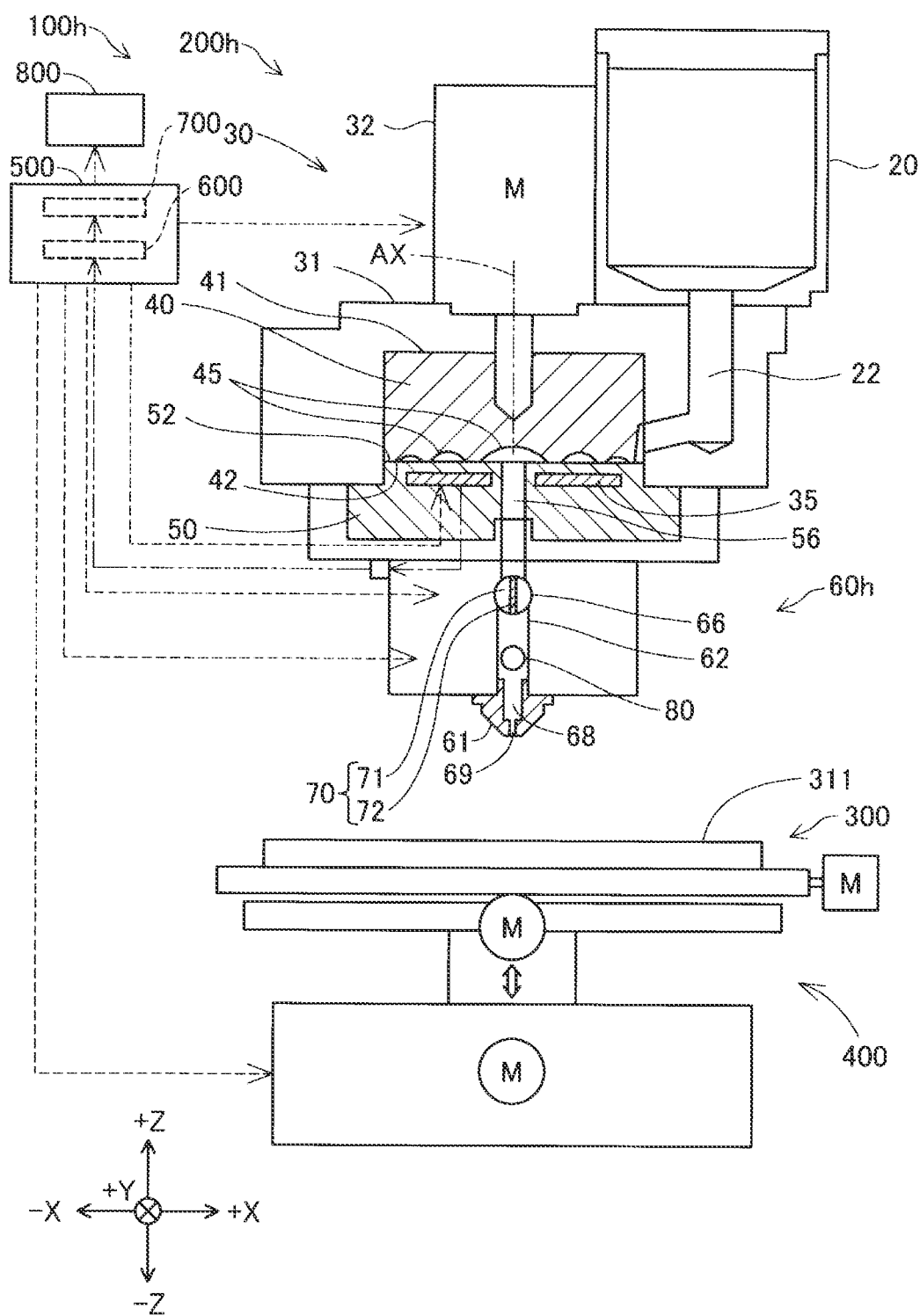
FIG. 17 is a view showing a schematic configuration of a three-dimensional shaping apparatus according to an eighth embodiment.

FIG. 17 is a view showing a schematic configuration of a three-dimensional shaping apparatus 100h according to an eighth embodiment. An ejection section 60h of a shaping unit 200h of this embodiment includes an ejection amount regulating section 70 and a suction section 80 unlike in the first embodiment. Points that are not particularly described with respect to the three-dimensional shaping apparatus 100h are the same as those of the first embodiment.

The ejection amount regulating section 70 is provided in the supply flow channel 62. The ejection amount regulating section 70 of this embodiment is constituted by a butterfly valve. The ejection amount regulating section 70 includes a drive shaft 71 that is a shaft-like member and a valve body 72 that has a plate shape and rotates with the rotation of the drive shaft 71. The drive shaft 71 is inserted into a crossing hole 66 so that a direction along the central axis of the drive shaft 71 and a flowing direction of the shaping material in the supply flow channel 62 cross each other.

The ejection amount regulating section 70 regulates the ejection amount by regulating the flow rate of the shaping material flowing through the supply flow channel 62. Specifically, the ejection amount regulating section 70 regulates the flow rate of the shaping material flowing through the supply flow channel 62 by changing the angle of rotation of the valve body 72. The degree of rotation of the valve body 72 is sometimes referred to as the valve opening ratio of the valve body 72. When a plate-shaped face of the valve body 72 becomes perpendicular to the flowing direction of the shaping material in the supply flow channel 62, the valve opening ratio becomes 0. When the valve opening ratio is 0, the plasticizing section 30 and the nozzle 61 do not communicate with each other, and the ejection of the shaping material from the nozzle 61 is stopped. When the plate-shaped face of the valve body 72 becomes parallel to the flowing direction of the shaping material in the supply flow channel 62, the valve opening ratio becomes 100. The ejection amount regulating section 70 of this embodiment is controlled by the control unit 500.

Figure 18:
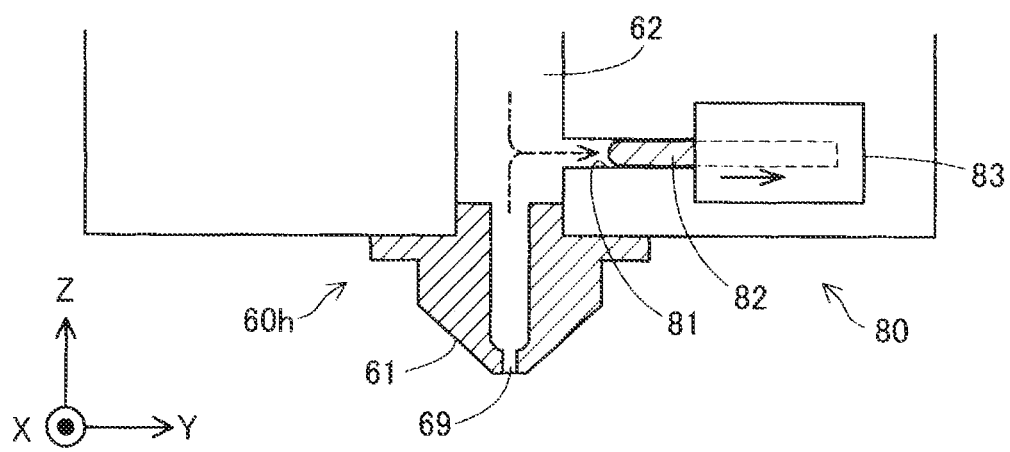
FIG. 18 is a view showing a schematic configuration of a suction section.

FIG. 18 is a view showing a schematic configuration of the suction section 80. The suction section 80 includes a cylinder 81 that has a cylindrical shape and is coupled downstream of the ejection amount regulating section 70 in the supply flow channel 62, a plunger 82 housed in the cylinder 81, and a plunger drive section 83 that drives the plunger 82. In this embodiment, the plunger drive section 83 is constituted by a motor that drives under the control of the control unit 500 and a rack and pinion that converts the rotation of the motor into movement in a translation direction along the axial direction of the cylinder 81. The plunger drive section 83, for example, may be constituted by a ball screw that converts the rotation of the motor into movement in a translation direction along the axial direction of the cylinder 81, or may be constituted by an actuator such as a solenoid mechanism or a piezo element.

As shown using the arrows in FIG. 18, when the plunger 82 moves in the +Y direction away from the supply flow channel 62, the pressure inside the cylinder 81 becomes negative, and therefore, the shaping material from the supply flow channel 62 to the nozzle 61 is sucked into the cylinder 81. On the other hand, when the plunger 82 moves in the −Y direction approaching the supply flow channel 62, the shaping material in the cylinder 81 is pushed out to the supply flow channel 62 by the plunger 82. Note that the movement of the plunger 82 toward the direction away from the supply flow channel 62 is sometimes referred to as backward movement of the plunger 82. In addition, the movement of the plunger 82 toward the direction approaching the supply flow channel 62 is sometimes referred to as forward movement of the plunger 82.

The control unit 500 causes the blunger 82 to move backward so as to suck the shaping material ejected from the ejection section 60h toward the cylinder 81, therefore can suppress tailing that is a phenomenon in which the shaping material drips from the nozzle hole 69 of the ejection section 60h and is formed into a string-like shape when stopping the ejection of the shaping material from the ejection section 60h. Note that suppression of this tailing is sometimes referred to as "tail cut". The control unit 500 can accurately control start or stop of the ejection of the shaping material from the ejection section 60h by controlling the ejection amount regulating section 70 and the suction section 80. For example, the control unit 500 can achieve tail cut by controlling the ejection amount regulating section 70 so as to stop the flow of the shaping material from the upstream to the downstream of the ejection amount regulating section 70, and further controlling the suction section 80.

Figure 19:
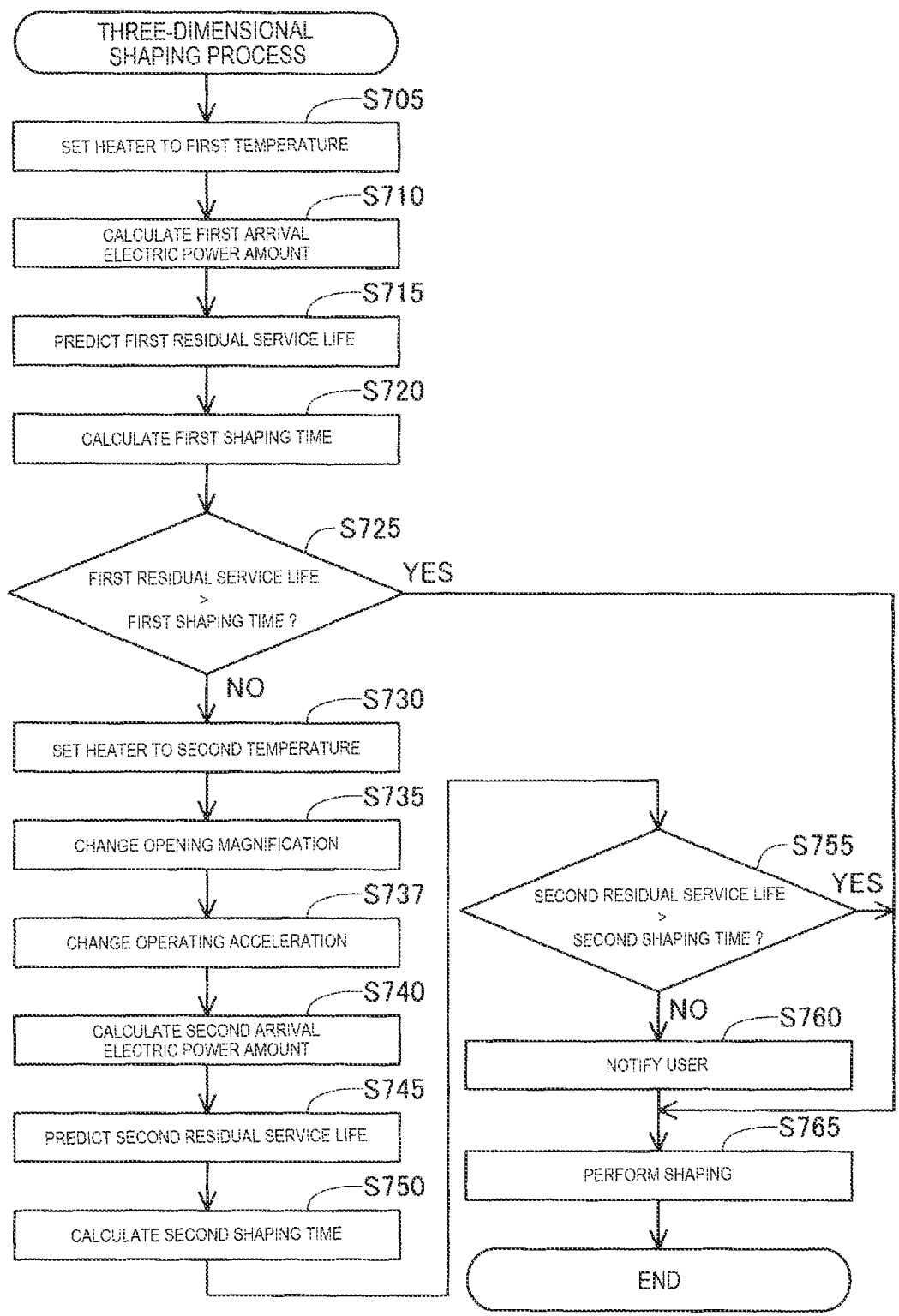
FIG. 19 is a process chart showing a shaping process for a three-dimensional shaped article according to the eighth embodiment.

FIG. 19 is a process chart showing a shaping process for a three-dimensional shaped article in the eighth embodiment. In this embodiment, the control unit 500 changes the opening magnification of the ejection amount regulating section 70 and the operating acceleration of the blunger 82, which will be described later, between the first mode and the second mode unlike in the first embodiment. Step S705 to Step S730 in FIG. 19 are the same as Step S105 to Step S130 in FIG. 4, and therefore, the description thereof will be omitted. Further, the process after Step S740 is the same as the process after Step S140 shown in FIG. 4, and therefore, the description thereof will be omitted.

The opening magnification of the ejection amount regulating section 70 refers to the degree of change in the valve opening ratio of the valve body 72 with respect to the opening degree of the ejection amount regulating section 70. For example, when the opening degree of the valve body 72 becomes 100 when the opening degree of the ejection amount regulating section 70 is 100, the opening magnification is 1. Further, when the opening degree of the valve body 72 becomes 100 when the opening degree of the ejection amount regulating section 70 is 50, the opening magnification is 2. The maximum value of the valve opening ratio is 100, and therefore, when the opening magnification is 2, the valve opening ratio when the opening degree exceeds 50 becomes 100.

In Step S735, the control unit 500 changes the opening magnification of the ejection amount regulating section 70. Specifically, the control unit 500 increases the opening magnification of the ejection amount regulating section 70 in the second mode in Step S735. Therefore, the valve opening ratio in the second mode becomes larger than the valve opening ratio in the first mode even if the opening degree is the same.

When the heater temperature is the second temperature, as compared with a case where the heater temperature is the first temperature T1, the temperature of the shaping material decreases, and therefore, the viscosity of the shaping material in the ejection section 60h increases. Due to this, in the second mode, the responsiveness of the change in the ejection amount to the valve opening ratio of the valve body 72 decreases as compared with that in the first mode in some cases. In particular, the viscosity of the shaping material is high, and therefore, the flow of the shaping material with respect to the change in the opening degree is delayed when the opening degree is increased for increasing the ejection amount, and the ejection amount decreases in some cases. The control unit 500 changes the opening magnification of the ejection amount regulating section 70 in Step S735 so as to suppress the degrease in the responsiveness of the ejection amount to the change in the opening degree in the second mode, and can suppress the decrease in the ejection amount. The opening magnification in the second mode is determined, for example, by an experiment as a value capable of compensating the decrease in the responsiveness of the ejection amount to the change in the opening degree in the second mode. When the change in the valve opening ratio with respect to the change in the opening degree is determined, for example, according to a calculation formula including a coefficient, the control unit 500 may change the operation magnification by changing the value of the coefficient between the second mode and the first mode.

In Step S737, the control unit 500 changes the operating acceleration of the plunger 82. Specifically, in Step S737, the control unit 500 increases the operating acceleration of the plunger 82 in the second mode.

As described above, in the second mode, the viscosity of the shaping material in the ejection section 60h increases. Due to this, in the second mode, the responsiveness of the flow of the shaping material to the movement of the plunger 82 decreases as compared with that in the first mode in some cases. For example, the responsiveness of retraction of the shaping material into the cylinder 81 to the backward movement of the plunger 82 decreases in some cases. In that case, suppression of tailing by the plunger 82 does not effectively function in some cases. The control unit 500 can suppress the decrease in the responsiveness of the flow of the shaping material to the movement of the plunger 82 in the second mode by changing the operating acceleration of the plunger 82 in Step S737. According to this, for example, in the second mode, the accuracy of suppression of tailing by the plunger 82 is improved, and the shaping quality is enhanced. The operating acceleration in the second mode is determined, for example, by an experiment as a value capable of compensating the decrease in the responsiveness of the flow of the shaping material to the movement of the plunger 82 in the second mode.

According also to the three-dimensional shaping apparatus 100h of the eighth embodiment described above, when deterioration of the heater 35 is in progress, a possibility that replacement of the heater 35 is needed in the middle of shaping of a three-dimensional shaped article is decreased, and deterioration of shaping quality due to suspension or resumption of shaping accompanying the replacement of the heater 35 is suppressed. In particular, in this embodiment, the opening magnification of the ejection amount regulating section 70 in the second mode is controlled so as to be higher than the opening magnification in the first mode. According to this, even when the temperature of the heater 35 is decreased, the decrease in the responsiveness of the change in the ejection amount to the change in the opening degree of the ejection amount regulating section 70 is suppressed. Accordingly, a decrease in the ejection amount is suppressed and a decrease in the line width of the shaping material is suppressed in the second mode.

Further, in this embodiment, the operating acceleration of the plunger 82 in the second mode is controlled so as to be larger than the operating acceleration in the first mode. According to this, even when the temperature of the heater 35 is decreased, the decrease in the responsiveness of the flow of the shaping material to the movement of the plunger 82 is suppressed. Accordingly, the accuracy of suppression of tailing by the plunger 82 is improved and the shaping quality is enhanced in the second mode.

In the eighth embodiment, the operating acceleration of the plunger 82 is changed after changing the opening magnification of the ejection amount regulating section 70. On the other hand, in another embodiment, for example, the opening magnification of the ejection amount regulating section 70 may be changed after changing the operating acceleration of the plunger 82. Further, a configuration in which either one of the opening magnification of the ejection amount regulating section 70 and the operating acceleration of the plunger 82 is changed in the second mode may be adopted. In addition, only one of the ejection amount regulating section 70 and the plunger 82 may be provided.

I. Other Embodiments (I-1) In the above embodiment, the state observation section 600 calculates the arrival electric power amount to be predicted at a stage before the heater temperature arrives at the determination temperature. On the other hand, for example, the arrival electric power amount as an actual measurement value may be calculated after the heater temperature arrives at the determination temperature.

(I-2) In the above embodiment, the state observation section 600 observes the arrival electric power amount as the state of the heater 35. On the other hand, the state observation section 600 may observe not the arrival electric power amount, but the arrival time required for the temperature of the heater 35 to arrive at the determination temperature as the state of the heater 35. Specifically, the state observation section 600 can observe the arrival time based on the change in the heater temperature with respect to the operation time of the heater 35 in the same manner as the observation of the arrival electric power amount shown in FIG. 5. Further, in that case, the prediction section 700 may predict the residual service life by predicting a time when the arrival time exceeds the determination value. Specifically, the prediction section 700 can predict the residual service life using the increase history of the arrival time in the same manner as the increase history of the arrival electric power amount shown in FIG. 6. Further, the state observation section 600 need not observe the arrival electric power amount or the arrival time as the state of the heater 35. For example, the state observation section 600 may observe the cumulative electric power consumption of the heater 35 as the state of the heater 35. In that case, the prediction section 700 may predict the residual service life by predicting a time when the cumulative electric power consumption of the heater 35 exceeds the determination value.

(I-3) In the above embodiment, the control unit 500 uses the first temperature T1 as the determination temperature in the state observation of the heater 35. On the other hand, the control unit 500 need not use the first temperature T1 as the determination temperature. For example, as the determination temperature, a temperature lower than the first temperature T1 may be used or a temperature higher than the first temperature T1 may be used. Therefore, for example, in Step S105 shown in FIG. 4, the control by the control unit 500 need not be set to the first mode.

(I-4) In the above embodiment, the screw 40 is a flat screw. On the other hand, the screw 40 may be not a flat screw, but another screw. The screw 40 may be, for example, an inline screw that is rotated by the drive motor 32. In that case, the plasticizing section 30 need not include the barrel 50.

(I-5) In the above embodiment, the prediction section 700 predicts the residual service life of the heater 35 as a time until the heater 35 arrives at the end of its service life. On the other hand, the residual service life of the heater 35 need not be predicted as a time until the heater 35 arrives at the end of its service life. For example, the residual service life of the heater 35 may be predicted as an electric power amount until the heater 35 arrives at the end of its service life.

(I-6) In the above embodiment, the notification section 800 is constituted by a liquid crystal monitor that displays visual information. On the other hand, the notification section 800 need not be constituted by a liquid crystal monitor. The notification section 800 may be constituted, for example, as a speaker that makes a notification of voice information. Further, the notification section 800 may be constituted by a telecommunications device that makes a notification of information by transmitting a message to another computer or the like. Further, the notification section 800 may be configured to make a notification of information by using a plurality of notification units as described above in combination.

(I-7) In the above embodiment, the notification section 800 makes a notification of the service life information. On the other hand, the notification section 800 need not make a notification of the service life information. Further, the notification section 800 need not be provided in the three-dimensional shaping apparatus 100.

(I-8) In the above embodiment, two bar-shaped heaters 35 are embedded in the barrel 50. On the other hand, the heater 35 need not be embedded in the barrel 50. For example, the heater 35 may be provided in the screw 40. Further, the number of heaters 35 may be one or may be three or more.

(I-9) In the above embodiment, the shaping unit 200 plasticizes a material in a pellet form to form a shaping material and shapes a three-dimensional shaped article by stacking the shaping material on the stage 300. On the other hand, the shaping unit 200, for example, may be configured to shape a three-dimensional shaped article using a so-called FDM system in which a material in a filament form is plasticized to form a shaping material and a three-dimensional shaped article is shaped by stacking the shaping material on the stage 300.

(I-10) In the above embodiment, the control unit 500 exhibits a function as the state observation section 600 and the prediction section 700. On the other hand, the control unit 500 need not exhibit a function as the state observation section 600 and the prediction section 700. For example, the state observation section 600 and the prediction section 700 need not be constituted as part of the function of the control unit 500, but each of the state observation section 600 and the prediction section 700 may be constituted by a computer including one or more processors, a main storage device, and an input/output interface for performing signal input/output to/from the outside.

(I-11) In the above embodiment, the state observation section 600 observes the state of the heater 35 and the prediction section 700 predicts the service life of the heater 35. On the other hand, for example, the state of a mechanism other than the heater 35 is observed, and the service life thereof may be predicted. For example, as the state of the drive motor 32, the rotational speed with respect to the control value of the drive motor 32 is observed, and the service life of the drive motor 32 may be predicted based on the observation result. Here, when the rotational speed of the drive motor 32 is decreased for extending the service life of the drive motor 32, in order to compensate a decrease in the ejection amount due to the decrease in the rotational speed, the set temperature of the heater 35 may be changed, or in order to compensate a decrease in the deposit amount due to the decrease in the rotational speed, the moving speed of the ejection section 60 may be decreased. Further, for example, when the cooling section 120 is provided as in the seventh embodiment, as the state of the cooling section 120, the temperature of the refrigerant in the cooling section 120 is observed, and the service life of the cooling section 120 may be predicted based on the observation result. Here, when the output of the cooling section 120 is decreased for extending the service life of the cooling section 120, in order to compensate an increase in the temperature of the plasticizing section 30 due to the decrease in the output of the cooling section 120, the set temperature of the heater 35 may be decreased. Further, for example, when the ejection amount regulating section 70 or the suction section 80 is provided as in the eighth embodiment, as the state of the ejection amount regulating section 70 or the suction section 80, the responsiveness of the operation to the control value of the ejection amount regulating section 70 or the suction section 80 is observed, and the service life of the ejection amount regulating section 70 or the suction section 80 may be predicted based on the observation result. Here, when the responsiveness of the ejection amount regulating section 70 or the suction section 80 decreases, the set temperature of the heater 35 is increased to decrease the viscosity of the shaping material, and the responsiveness of the flow of the shaping material to the operation of the ejection amount regulating section 70 or the suction section 80 may be improved.

J. Other Aspects

The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to the first aspect of the present disclosure, a three-dimensional shaping apparatus is provided. The three-dimensional shaping apparatus includes a plasticizing section that includes a drive motor, a heater, and a screw rotated by the drive motor and that plasticizes a material to form a shaping material, an ejection section that ejects the shaping material toward a stage, a moving mechanism section that changes a relative position of the ejection section to the stage, a state observation section that observes a state of the heater, a prediction section that predicts a residual service life of the heater from an observation result of the state observation section, and a control unit that controls the plasticizing section and the moving mechanism section to shape a three-dimensional shaped article. The control unit has a first mode in which a temperature of the heater is set to a first temperature and a second mode in which the temperature of the heater is set to a temperature lower than the first temperature, and shapes the three-dimensional shaped article in the first mode when a first residual service life that is the residual service life when the temperature of the heater is set to the first temperature exceeds a first value, and shapes the three-dimensional shaped article in the second mode when the first residual service life is equal to or less than the first value.

According to such an aspect, when deterioration of the heater is in progress, a three-dimensional shaped article is shaped by setting the heater to a temperature lower than the first temperature, and therefore, a period until the heater arrives at the end of its service life is extended. Accordingly, even when deterioration of the heater is in progress, a possibility that replacement of the heater is needed in the middle of shaping of a three-dimensional shaped article is decreased, and deterioration of shaping quality due to suspension or resumption of shaping accompanying the replacement of the heater is suppressed. Further, when deterioration of the heater is not in progress, a three-dimensional shaped article can be shaped without decreasing the set temperature of the heater.

(2) In the three-dimensional shaping apparatus of the above aspect, the control unit may change a rotational speed of the drive motor between the first mode and the second mode. According to such an aspect, in the second mode, even when the viscosity of the shaping material is increased due to a decrease in the temperature of the heater, by changing the rotational speed of the drive motor, a decrease in the ejection amount of the shaping material is suppressed. Accordingly, shaping quality in the second mode is enhanced.

(3) In the three-dimensional shaping apparatus of the above aspect, the control unit may relatively move the ejection section with respect to the stage at a first speed in the first mode, and may relatively move the ejection section with respect to the stage at a second speed lower than the first speed in the second mode. According to such an aspect, even when the viscosity of the shaping material is increased due to a decrease in the temperature of the heater, a decrease in the deposit amount of the shaping material is suppressed, and a decrease in the line width is suppressed. Accordingly, shaping quality in the second mode is enhanced.

(4) In the three-dimensional shaping apparatus of the above aspect, the state observation section may observe an arrival time required for the temperature of the heater to arrive at a determination temperature or an arrival electric power amount required for the temperature of the heater to arrive at the determination temperature as the state of the heater, and the prediction section may predict the residual service life by predicting a time when the arrival time or the arrival electric power amount exceeds a determination value. According to such an aspect, the state of the heater can be easily observed when the temperature of the heater is increased. Therefore, the residual service life of the heater can be efficiently predicted by efficiently observing the state of the heater.

(5) In the three-dimensional shaping apparatus of the above aspect, a temperature acquisition section that acquires an ambient temperature being a temperature outside the plasticizing section may be included, and the control unit may determine the determination value to be a first determination value when the ambient temperature is a first ambient temperature, and may determine the determination value to be a second determination value lower than the first determination value when the ambient temperature is a second ambient temperature higher than the first ambient temperature. According to such an aspect, the effect of the ambient temperature is added to the prediction of the residual service life of the heater by the prediction section, and the residual service life is more appropriately predicted. Therefore, a possibility that replacement of the heater is needed in the middle of shaping of a three-dimensional shaped article is further decreased, and deterioration of shaping quality due to suspension or resumption of shaping accompanying the replacement of the heater is further suppressed.

(6) In the three-dimensional shaping apparatus of the above aspect, the screw may rotate around a rotational axis and have a grooved face with a groove formed therein, and the plasticizing section may include a barrel opposed to the grooved face. According to such an aspect, the plasticizing section can be miniaturized, and therefore, the three-dimensional shaping apparatus can be miniaturized.

(7) In the three-dimensional shaping apparatus of the above aspect, the prediction section may predict the residual service life as a time until the heater arrives at the end of its service life, and the control unit may shape the three-dimensional shaped article according to shaping data including a relative movement path of the ejection section to the stage and a line width of the shaping material in the movement path, and calculate a first shaping time required for shaping the three-dimensional shaped article in the first mode based on the shaping data and control values when controlling the plasticizing section and the moving mechanism section in the first mode, and determine the first shaping time as the first value. According to such an aspect, the first mode and the second mode are selected based on the determination as to whether or not the first residual service life exceeds the first value. Therefore, even when deterioration of the heater is in progress, a possibility that replacement of the heater is needed in the middle of shaping of a three-dimensional shaped article is further decreased, and deterioration of shaping quality due to suspension or resumption of shaping accompanying the replacement of the heater is further suppressed.

(8) In the three-dimensional shaping apparatus of the above aspect, a notification section may be included, and the prediction section may predict a second residual service life that is the residual service life when the heater is controlled at a second temperature lower than the first temperature when the first residual service life is equal to or less than the first value, and the control unit may set the temperature of the heater to the second temperature in the second mode, calculate a second shaping time required for shaping the three-dimensional shaped article based on the shaping data and control values when controlling the plasticizing section and the moving mechanism section in the second mode, and determine a second value as the second shaping time, and control the notification section to make a notification of service life information indicating that the second residual service life is equal to or less than the first value before shaping the three-dimensional shaped article when the second residual service life is equal to or less than the second value. According to such an aspect, when a user is notified of the service life information, for example, the user can shape the three-dimensional shaped article after replacing the heater, the deterioration of which has progressed, with a heater, the deterioration of which has not progressed. In addition, when a notification of the service life information is not made, the three-dimensional shaped article is shaped in the second mode. Therefore, a possibility that replacement of the heater is needed in the middle of shaping of a three-dimensional shaped article is decreased, and deterioration of shaping quality due to suspension or resumption of shaping accompanying the replacement of the heater is further suppressed.

(9) In the three-dimensional shaping apparatus of the above aspect, the control unit may shape the three-dimensional shaped article according to shaping data including a movement path of the ejection section with respect to the stage and a line width of the shaping material in the movement path, the control unit may acquire first shaping data that are the shaping data for shaping the three-dimensional shaped article using a first material having a first glass transition temperature, and second shaping data that are the shaping data for shaping the three-dimensional shaped article using a second material having a second glass transition temperature lower than the first glass transition temperature, and the three-dimensional shaped article may be shaped according to the second shaping data before shaping the three-dimensional shaped article according to the first shaping data in the second mode. According to such an aspect, a possibility that replacement of the heater is needed in the middle of shaping of a three-dimensional shaped article according to the second shaping data is decreased. Accordingly, the three-dimensional shaped article that is likely to be efficiently shaped with high accuracy in the second mode is preferentially shaped, and the shaping accuracy and shaping efficiency of the three-dimensional shaped article in the second mode are enhanced.

(10) According to the second aspect of the present disclosure, a three-dimensional shaped article production method for shaping a three-dimensional shaped article by plasticizing a material to form a shaping material using a plasticizing section including a drive motor, a heater, and a screw rotated by the drive motor and ejecting the shaping material from an ejection section toward a stage is provided. This production method includes a first step of observing a state of the heater, a second step of predicting a residual service life of the heater when the heater is controlled at a first temperature from an observation result of the heater, and a third step of shaping the three-dimensional shaped article by controlling the plasticizing section and a moving mechanism section that changes a relative position of the ejection section to the stage. In the third step, when the residual service life exceeds a first value, the three-dimensional shaped article is shaped by controlling a temperature of the heater to the first temperature, and when the residual service life is equal to or less than the first value, the three-dimensional shaped article is shaped by controlling the temperature of the heater to a temperature lower than the first temperature.

According to such an aspect, when deterioration of the heater is in progress, a three-dimensional shaped article is shaped by setting the heater to a temperature lower than the first temperature, and therefore, a period until the heater arrives at the end of its service life is extended. Accordingly, even when deterioration of the heater is in progress, a possibility that replacement of the heater is needed in the middle of shaping of a three-dimensional shaped article is decreased, and deterioration of shaping quality due to suspension or resumption of shaping accompanying the replacement of the heater is suppressed. Further, when deterioration of the heater is not in progress, a three-dimensional shaped article can be shaped without decreasing the set temperature of the heater.

The present disclosure is not limited to the above-mentioned three-dimensional shaping apparatus and three-dimensional shaped article production method, and can be realized in various forms. For example, it can be realized in forms such as a method for controlling a three-dimensional shaping apparatus, a computer program for shaping a three-dimensional shaped article, and a recording medium, which is not temporary but is tangible, and in which a computer program has been recorded.

What is claimed is:
1. A three-dimensional shaping apparatus, comprising:
a plasticizing section that includes a drive motor, a heater, and a screw rotated by the drive motor and that plasticizes a material to form a shaping material;
an ejection section that ejects the shaping material toward a stage;
a moving mechanism section that changes a relative position of the ejection section to the stage;
a state observation section that observes a state of the heater;
a prediction section that predicts a residual service life of the heater from an observation result of the state observation section; and
a control unit that controls the plasticizing section and the moving mechanism section to shape a three-dimensional shaped article, wherein the control unit
- has a first mode in which a temperature of the heater is set to a first temperature and a second mode in which the temperature of the heater is set to a temperature lower than the first temperature, and
- shapes the three-dimensional shaped article in the first mode when a first residual service life that is the residual service life when the temperature of the heater is set to the first temperature exceeds a first value, and
- shapes the three-dimensional shaped article in the second mode when the first residual service life is equal to or less than the first value.

2. The three-dimensional shaping apparatus according to claim 1, wherein the control unit changes a rotational speed of the drive motor between the first mode and the second mode.

3. The three-dimensional shaping apparatus according to claim 1, wherein the control unit relatively moves the ejection section with respect to the stage at a first speed in the first mode, and relatively moves the ejection section with respect to the stage at a second speed lower than the first speed in the second mode.

4. The three-dimensional shaping apparatus according to claim 1, wherein
- the state observation section observes an arrival time required for the temperature of the heater to arrive at a determination temperature or an arrival electric power amount required for the temperature of the heater to arrive at the determination temperature as the state, and
- the prediction section predicts the residual service life by predicting a time when the arrival time or the arrival electric power amount exceeds a determination value.

5. The three-dimensional shaping apparatus according to claim 4, further comprising a temperature acquisition section that acquires an ambient temperature being a temperature outside the plasticizing section, wherein
- the control unit determines the determination value to be a first determination value when the ambient temperature is a first ambient temperature, and determines the determination value to be a second determination value lower than the first determination value when the ambient temperature is a second ambient temperature higher than the first ambient temperature.

6. The three-dimensional shaping apparatus according to claim 1, wherein
- the screw rotates around a rotational axis and has a grooved face with a groove formed therein, and
- the plasticizing section includes a barrel opposed to the grooved face.

7. The three-dimensional shaping apparatus according to claim 1, wherein
- the prediction section predicts the residual service life as a time until the heater arrives at the end of its service life, and the control unit
- shapes the three-dimensional shaped article according to shaping data including a relative movement path of the ejection section to the stage and a line width of the shaping material in the movement path, and
- calculates a first shaping time required for shaping the three-dimensional shaped article in the first mode based on the shaping data and control values when controlling the plasticizing section and the moving mechanism section in the first mode, and determines the first shaping time as the first value.

8. The three-dimensional shaping apparatus according to claim 7, further comprising a notification section, wherein
- the prediction section predicts a second residual service life that is the residual service life when the heater is controlled at a second temperature lower than the first temperature when the first residual service life is equal to or less than the first value, and
- the control unit
  - sets the temperature of the heater to the second temperature in the second mode,
  - calculates a second shaping time required for shaping the three-dimensional shaped article based on the shaping data and control values when controlling the plasticizing section and the moving mechanism section in the second mode, and determines a second value as the second shaping time, and
  - controls the notification section to make a notification of service life information indicating that the second residual service life is equal to or less than the second value before shaping the three-dimensional shaped article when the second residual service life is equal to or less than the second value.

9. The three-dimensional shaping apparatus according to claim 1, wherein
- the control unit shapes the three-dimensional shaped article according to shaping data including a movement path of the ejection section with respect to the stage and a line width of the shaping material in the movement path,
- the control unit acquires first shaping data that are the shaping data for shaping the three-dimensional shaped article using a first material having a first glass transition temperature, and second shaping data that are the shaping data for shaping the three-dimensional shaped article using a second material having a second glass transition temperature lower than the first glass transition temperature, and
- the three-dimensional shaped article is shaped according to the second shaping data before shaping the three-dimensional shaped article according to the first shaping data in the second mode.

\* \* \* \* \*